(12) United States Patent
Kneckt et al.

(10) Patent No.: US 11,677,507 B2
(45) Date of Patent: Jun. 13, 2023

(54) FASTER RETRANSMISSION IN MULTI-LINK COMMUNICATION

(71) Applicant: Apple Inc., Cupertino, CA (US)

(72) Inventors: Jarkko L. Kneckt, Los Gatos, CA (US); Jinjing Jiang, San Jose, CA (US); Yong Liu, Campbell, CA (US); Guoqing Li, Campbell, CA (US); Tianyu Wu, Freemont, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 17/183,170

(22) Filed: Feb. 23, 2021

(65) Prior Publication Data

US 2021/0266108 A1    Aug. 26, 2021

Related U.S. Application Data

(60) Provisional application No. 62/980,518, filed on Feb. 24, 2020.

(51) Int. Cl.
*H04L 1/1812* (2023.01)

(52) U.S. Cl.
CPC .................................. *H04L 1/1812* (2013.01)

(58) Field of Classification Search
CPC ... H04L 1/1812; H04L 1/1614; H04L 1/1671; H04L 1/1854
See application file for complete search history.

(56) References Cited

U.S. PATENT DOCUMENTS

| | | |
|---|---|---|
| 2018/0184409 A1 | 6/2018 | Min et al. |
| 2019/0150214 A1 | 5/2019 | Zhou et al. |
| 2020/0204222 A1* | 6/2020 | Lou ........................ H04B 7/0695 |
| 2020/0288523 A1* | 9/2020 | Patil ....................... H04W 80/02 |
| 2020/0359392 A1* | 11/2020 | Zhu ........................ H04W 74/08 |
| 2021/0091887 A1* | 3/2021 | Cho ........................ H04L 1/1614 |
| 2021/0136819 A1* | 5/2021 | Seok .................. H04W 72/0446 |
| 2022/0132562 A1* | 4/2022 | Yang ..................... H04W 76/15 |

OTHER PUBLICATIONS

Politis et al., "Exploiting Reverse Direction Protocol in Full Duplex WLANs"; 2020 9th International Conference on Modern Circuits and Systems Technologies (MOCAST); Serres, Greece; 2020; 4 pages.

Morino et al., "Analysis evaluation of multiplex transmission using MIMO transmission and A-MPDU for a collision detection scheme in WLAN"; Niigata, Japan; 2014; 5 pages.

* cited by examiner

*Primary Examiner* — Abdullahi Ahmed
(74) *Attorney, Agent, or Firm* — Kowert, Hood, Munyon, Rankin & Goetzel, P.C.

(57) ABSTRACT

An electronic device (such as an access point) that performs a remedial action is described. This electronic device may transmit, using a first radio in the electronic device, a physical layer convergence protocol (PLCP) protocol data unit (PPDU) to a recipient electronic device on a first link between the electronic device and the recipient electronic device, where the PPDU includes a PPDU preamble and a set of media access control (MAC) protocol data units (MPDUs). Then, the electronic device may receive, using a second radio in the electronic device, feedback from the recipient electronic device on a second link between the electronic device and the recipient electronic device. Next, the electronic device may perform the remedial action based at least in part on the feedback. For example, the electronic device may abort the PPDU transmission and/or retransmit one or more of the set of MPDUs.

21 Claims, 20 Drawing Sheets

FASTER RETRANSMISSION IN MULTI-LINK COMMUNICATION

CROSS-REFERENCE TO RELATED APPLICATION

This application claims the benefit of U.S. Provisional Application No. 62/980,518, entitled "Fast Retransmission in Multi-Link Communication," by Jarkko L. Kneckt, et al., filed Feb. 24, 2020, the contents of which are hereby incorporated by reference.

FIELD

The described embodiments relate, generally, to wireless communications among electronic devices, including techniques for performing remedial action in multi-link communication.

BACKGROUND

Many electronic devices communicate with each other using wireless local area networks (WLANs), such as those based on a communication protocol that is compatible with an Institute of Electrical and Electronics Engineers (IEEE) standard, such as an IEEE 802.11 standard (which is sometimes referred to as 'Wi-Fi').

IEEE 802.11be is studying multi-link operations. In multi-link transmissions, data may be transmitted over multiple links. For example, a first link may transmit a physical layer convergence protocol (PLCP) protocol data unit (PPDU) that includes: a PPDU preamble with a synchronization sequence and information fields that identify a transmitter and a receiver; a data partition or payload. Multi-link stations (which are sometimes referred to as 'clients', 'receivers' or 'recipient electronic devices') can setup a block acknowledgment that transmits data from the same traffic identifier (TID) over multiple links. The current block acknowledgment approach transmits a block acknowledgment to a transmission only after a whole PPDU that carries the transmitted frames is transmitted. In some cases, the receiver may detect that PPDU payload transmission will not be received, but it cannot interrupt the ongoing transmission. This may waste the transmission time and increase transmission overheads.

SUMMARY

An electronic device that performs a remedial action is described. This electronic device may include: a first node (or a pad or a connector) that is communicatively coupled to a first antenna, and a second node configured to communicatively couple to a second antenna; and a first radio communicatively coupled to the first node and a second radio, communicatively coupled to the second node, where the first radio and the second radio concurrently communicate with a recipient electronic device. During operation, the electronic device may transmit, from the first radio, a PPDU addressed to (or intended for) the recipient electronic device on (or associated with) a first link between the electronic device and the recipient electronic device, where the PPDU includes a PPDU preamble and a set of media access control (MAC) protocol data units (MPDUs). Then, the electronic device may receive, at the second radio, feedback from (or associated with) the recipient electronic device on (or associated with) a second link between the electronic device and the recipient electronic device. Next, the electronic device may perform the remedial action based at least in part on the feedback.

Moreover, the remedial action may include aborting the transmission of the PPDU. Furthermore, the remedial action may include: retransmitting, from the first radio, one or more of the set of MPDUs addressed to (or intended for) the recipient electronic device and on (or associated with) the first link; and/or retransmitting, from the second radio, the one or more of the set of MPDUs addressed to (or intended for) the recipient electronic device and associated with the second link. In some embodiments, the electronic device may transition a transmit opportunity from the first link to the second link prior to retransmitting the one or more of the set of MPDUs addressed to (or intended for) the recipient electronic device using the second link.

Additionally, the feedback may include: a block acknowledgment during the transmission of the PPDU that aborts the transmission of the PPDU, an indication of at least a subset of the set of MPDUs that were not received by the recipient electronic device, and/or a hybrid automatic repeat request (HARD) negative acknowledgment (NACK). In some embodiments, the feedback is included in a control field of a MAC header in a block acknowledgment.

Note that the electronic device may transmit, addressed to (or intended for) the recipient electronic device, a modification when the feedback is allowed. In some embodiments, the modification may be transmitted in a beacon, a probe response and/or an association response.

Moreover, a transmitter and a receiver for a given radio may be implemented using a single integrated circuit or multiple integrated circuits.

Other embodiments provide one or more integrated circuits (which are sometimes referred to as 'communication circuits') for use with the electronic device. The one or more integrated circuits may perform at least some of the aforementioned operations.

Other embodiments provide a computer-readable storage medium for use with the electronic device. When program instructions stored in the computer-readable storage medium are executed by the electronic device, the program instructions may cause the electronic device to perform at least some of the aforementioned operations of the electronic device.

Other embodiments provide a method for performing a remedial action. The method includes at least some of the aforementioned operations performed by the electronic device.

Other embodiments provide a recipient electronic device that provides feedback. This recipient electronic device may include: a first node (or a pad or a connector) that is communicatively coupled to a first antenna, and a second node configured to communicatively couple to a second antenna; and a first radio communicatively coupled to the first node and a second radio, communicatively coupled to the second node, where the first radio and the second radio concurrently communicate with an electronic device. During operation, the recipient electronic device may receive, at the first radio, a PPDU, from (or associated with) the electronic device and on (or associated with) a first link between the electronic device and the recipient electronic device, where the PPDU includes a PPDU preamble and a set of MPDUs. Then, the recipient electronic device may compare estimated MPDUs in the set of MPDUs, which are based at least in part on the PPDU preamble, to the received set of MPDUs. Next, the recipient electronic device may provide, from the second radio, the feedback addressed to (or intended for) the electronic device and on (or associated with) a second link between the electronic device and the recipient electronic device, where the feedback is based at least in part on the comparison.

Moreover, the feedback may be provided while the PPDU is being received. Alternatively or additionally, the feedback may be provided based at least in part on a feedback criterion. In some embodiments, the feedback may be included in a control field of a MAC header in a block acknowledgment.

Note that the feedback criterion may correspond to an access category of the PPDU. Furthermore, the feedback criterion may include one or more of: a predefined elapsed time since a start of receiving the PPDU, a predefined time duration before an end of receiving the PPDU, and/or a failed transmission time associated with at least a subset of the set of MPDUs when no MPDUs are received. In some embodiments, the feedback may include: a block acknowledgment, an indication of at least a subset of the set of MPDUs that were not received by the recipient electronic device, and/or a HARQ NACK.

Additionally, the recipient electronic device may receive, from (or associated with) the electronic device, a modification when the feedback is allowed. In some embodiments, the modification is received in a beacon, a probe response and/or an association response.

Moreover, the recipient electronic device may request a transmit opportunity on the second link to provide the feedback.

Furthermore, a transmitter and a receiver for a given radio may be implemented using a single second integrated circuit or multiple second integrated circuits.

Other embodiments provide one or more second integrated circuits (which are sometimes referred to as 'communication circuits') for use with the recipient electronic device. The one or more second integrated circuits may perform at least some of the aforementioned operations.

Other embodiments provide a computer-readable storage medium for use with the recipient electronic device. When program instructions stored in the computer-readable storage medium are executed by the recipient electronic device, the program instructions may cause the recipient electronic device to perform at least some of the aforementioned operations of the recipient electronic device.

Other embodiments provide a method for providing feedback. The method includes at least some of the aforementioned operations performed by the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
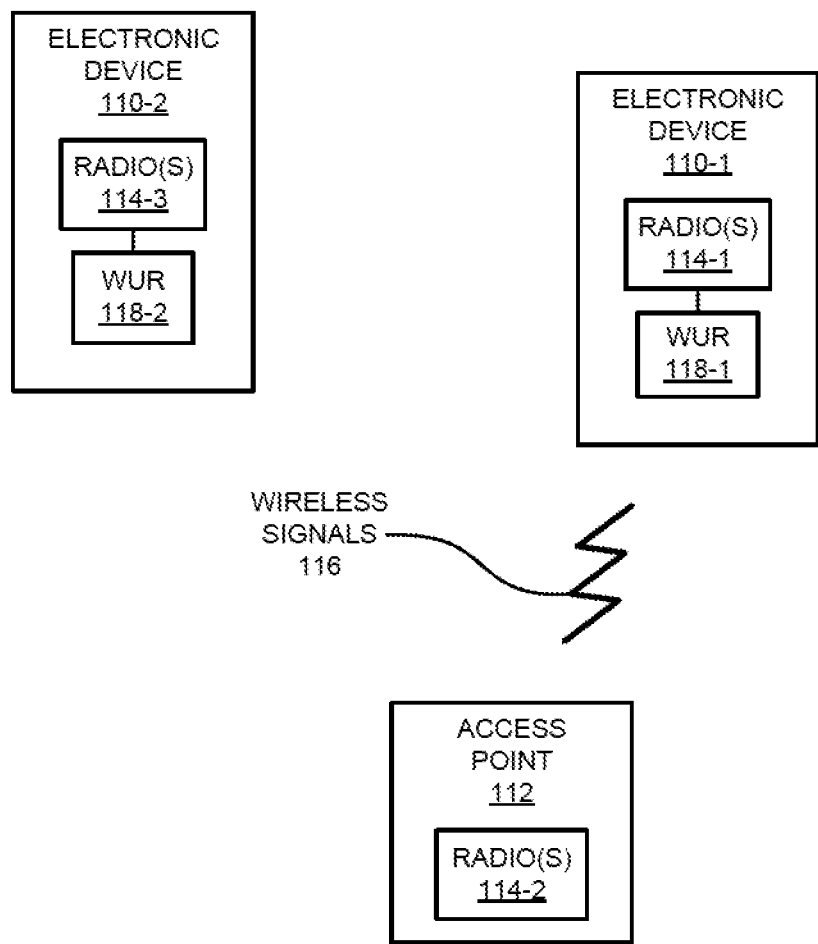
FIG. 1 is a block diagram illustrating an example of communication between electronic devices.

An electronic device (such as an access point) that performs a remedial action is described. This electronic device may transmit, using a first radio in the electronic device, a PPDU to a recipient electronic device on a first link between the electronic device and the recipient electronic device, where the PPDU includes a PPDU preamble and a set of MPDUs. Then, the electronic device may receive, using a second radio in the electronic device, feedback from the recipient electronic device on a second link between the electronic device and the recipient electronic device. Next, the electronic device may perform the remedial action based at least in part on the feedback. For example, the electronic device may abort the PPDU transmission and/or retransmit one or more of the set of MPDUs.

Moreover, a recipient electronic device (such as a cellular telephone, a computer, a wearable electronic device, or a portable electronic device) that provides feedback is described. This recipient electronic device may receive, using a first radio in the recipient electronic device, a PPDU, from an electronic device and on a first link between the electronic device and the recipient electronic device, where the PPDU includes a PPDU preamble and a set of MPDUs. Then, the recipient electronic device may compare estimated MPDUs in the set of MPDUs, which are based at least in part on the PPDU preamble, to the received set of MPDUs. Next, the recipient electronic device may provide, using a second radio in the recipient electronic device, the feedback to the electronic device and on a second link between the electronic device and the recipient electronic device, where the feedback is based at least in part on the comparison.

By concurrently communicating using the first link and the second link, including the providing feedback during the communication of the PPDU, the communication techniques may allow the recipient electronic device to detect that the PPDU payload transmission will not be received and to notify the electronic device so that it can perform the remedial action. In these ways, the communication techniques may reduce or eliminate wasted transmission time to transmit MPDUs that cannot be received by the recipient electronic device, and thus may decrease transmission overheads. Moreover, the communication techniques may provide faster retransmission, which reduces transmission delays and improves transmission throughputs. Consequently, the communication techniques may facilitate improved communication performance of the electronic device and/or the recipient electronic device(s), which may improve the user experience and customer satisfaction.

Note that the communication techniques may be used during wireless communication between electronic devices in accordance with a communication protocol, such as a communication protocol that is compatible with an IEEE 802.11 standard (which is sometimes referred to as Wi-Fi). In some embodiments, the communication techniques are used with IEEE 802.11be, which is used as an illustrative example in the discussion that follows. However, this communication techniques may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth Special Interest Group and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN), a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11-2016; IEEE 802.11ac; IEEE 802.11ax, IEEE 802.11ba, IEEE 802.11be, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet'). However, in other embodiments the electronic device may not be an access point. As an illustrative example, in the discussion that follows the electronic device is or includes an access point.

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable. More generally, the electronic devices described herein may be capable of communicating with other present or future developed cellular-telephone technologies.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with or may have a connection with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

Figure 20:
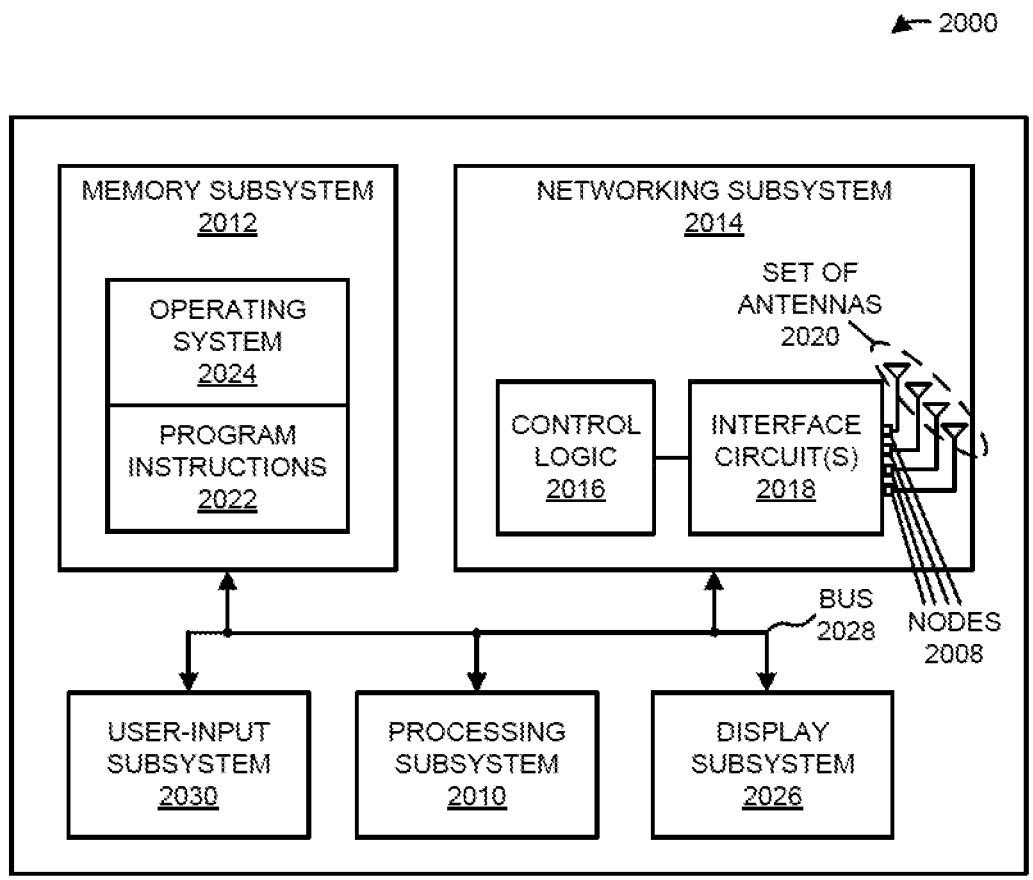
FIG. 20 is a block diagram illustrating an example of an electronic device of FIG. 1.

As described further below with reference to FIG. 20, electronic devices 110 and access point 112 may include subsystems, such as a networking subsystem, a memory subsystem, and a processor subsystem. In addition, electronic devices 110 and access point 112 may include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by one or more radios 114-1 and 114-2 in electronic device 110-1 and access point 112, respectively. For example, as noted previously, electronic device 110-1 and access point 112 may exchange packets or frames using a Wi-Fi communication protocol in a WLAN. As illustrated further below with reference to FIGS. 2-19, one or more radios 114-1 may receive wireless signals 116 that are transmitted by one or more radios 114-2 via one or more links between electronic device 110-1 and access point 112. Alternatively, the one or more radios 114-1 may transmit wireless signals 116 that are received by the one or more radios 114-2.

In some embodiments, wireless signals 116 are communicated by one or more radios 114 in electronic devices 110 and access point 112, respectively. For example, one or more radios 114-1 and 114-3 may receive wireless signals 116 that are transmitted by one or more radios 114-2 via one or more links between electronic devices 110-1 and 110-2, and access point 112.

Note that the one or more radios 114-1 may consume additional power in a higher-power mode. If the one or more radios 114-1 remain in the higher-power mode even when they are not transmitting or receiving packets or frames, the power consumption of electronic device 110-1 may be needlessly increased. Consequently, electronic devices 110 may include wake-up radios (WURs) 118 that listen for and/or receive wake-up frames (and/or other wake-up communications), e.g., from access point 112. When a particular electronic device (such as electronic device 110-1) receives a wake-up frame, WUR 118-1 may selectively wake-up radio 114-1, e.g., by providing a wake-up signal that selectively transitions at least one of the one or more radios 114-1 from a lower-power mode to the higher-power mode.

As discussed previously, one or more of electronic devices 110 (such as electronic device 110-1) and access point 112 may communicate with each other. Notably, access point 112 may transmit a PPDU with a PPDU preamble and set of MPDUs. However, in existing IEEE 802.11 communication protocols, if electronic device 110-1 determines that it is unable to receive at least some of the set of MPDUs, it may not be able to alert access point 112 until access point 112 has completed transmitting the PPDU.

In order to address this challenge, as described below with reference to FIGS. 2-19, in some embodiments of the disclosed communication techniques access point 112 may perform a remedial action in response to feedback received on a second link between access point 112 and electronic device 110-1 than a first link between access point 112 and electronic device 110-1 that access point 112 is using to concurrently transmit the PPDU.

Notably, access point 112 may transmit a PPDU to electronic device on the first link, where the PPDU includes the PPDU preamble and the set of MPDUs. After receiving the PPDU on the first link, electronic device 110-1 compare estimated MPDUs in the set of MPDUs, which are based at least in part on the PPDU preamble, to the received set of MPDUs. Then, electronic device 110-1 may provide the feedback to access point 112 and on the second link, where the feedback is based at least in part on the comparison.

Next, access point 112 may receive the feedback from electronic device 110-1 on the second link. Moreover, access point 112 may perform the remedial action based at least in part on the feedback. For example, access point 112 may abort or terminate the current transmission of the PPDU and/or may retransmit the PPDU.

In summary, the communication techniques may allow electronic devices 110 and access point 112 to avoid wasted transmission time associated with transmission of MPDUs that electronic devices 110 are unable to receive and/or to have faster retransmission using multi-link transmissions. Therefore, the communication techniques may reduce transmission delays and/or may improve transmission throughputs. Consequently, the communication techniques may improve the communication performance of electronic devices 110 and access point 112.

By concurrently communicating using the first link and the second link, including the providing feedback during the communication of the PPDU, the communication techniques may allow the recipient electronic device to detect that the PPDU payload transmission will not be received and to notify the electronic device so that it can perform the remedial action. In these ways, the communication techniques may reduce or eliminate wasted transmission time to transmit MPDUs that cannot be received by the recipient electronic device, and thus may decrease transmission overheads. Moreover, the communication techniques may provide faster retransmission, which reduces transmission delays and improves transmission throughputs. Consequently, the communication techniques may facilitate improved communication performance of the electronic device and/or the recipient electronic device(s), which may improve the user experience and customer satisfaction.

Note that access point 112 and one or more electronic devices (such as electronic devices 110-1 and/or 110-2) may be compatible with an IEEE 802.11 standard that includes trigger-based channel access (such as IEEE 802.11ax). However, access point 112 and the one or more electronic devices may also communicate with one or more legacy electronic devices that are not compatible with the IEEE 802.11 standard (i.e., that do not use multi-user trigger-based channel access). In some embodiments, access point 112 and the one or more electronic devices use multi-user transmission (such as OFDMA). For example, the one or more radios 114-2 may provide one or more trigger frames for the one or more electronic devices. Moreover, in response to receiving the one or more trigger frames, the one or more radios 114-1 may provide one or more group or block acknowledgments to the one or more radios 114-2. For example, the one or more radios 114-1 may provide the one or more group acknowledgments during associated assigned time slot(s) and/or in an assigned channel(s) in the one or more group acknowledgments. However, in some embodiments one or more of electronic devices 110 may individually provide acknowledgments to the one or more radios 114-2. Thus, the one or more radios 114-1 (and, more generally, radios 114 in the electronic devices 110-1 and/or 110-2) may provide one or more acknowledgments to the one or more radios 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication techniques may be characterized by a variety of communication-performance metrics. For example, the communication-performance metric may include any/all of: an RSSI, a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of a number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames. In some embodiments, multiple links may be used during communication between electronic devices 110. Consequently, one of electronic devices 110 may perform operations in the communication techniques.

Figure 2:
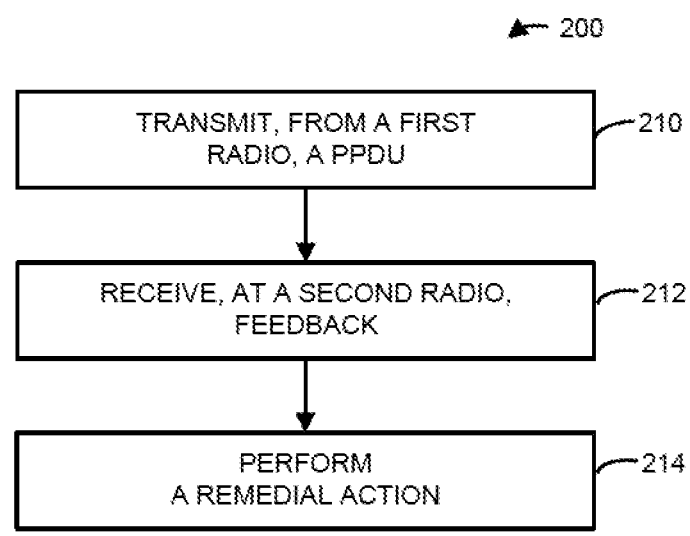
FIG. 2 is a flow diagram illustrating an example method for performing a remedial action using an electronic device of FIG. 1.

FIG. 2 presents a flow diagram illustrating an example method 200 for performing a remedial action. This method may be performed by an electronic device, such as access point 112 in FIG. 1. Note that the communication with a recipient electronic device may be compatible with an IEEE 802.11 communication protocol.

During operation, the electronic device may transmit, from a first radio in the electronic device, a PPDU (operation 210) to the recipient electronic device on a first link between the electronic device and the recipient electronic device, where the PPDU includes a PPDU preamble and a set of MPDUs. Then, the electronic device may receive, at a second radio in the electronic device, feedback (operation 212) from the recipient electronic device on a second link between the electronic device and the recipient electronic device. Next, the electronic device may perform the remedial action (operation 214) based at least in part on the feedback.

The remedial action may include aborting the transmission of the PPDU. Furthermore, the remedial action may include: retransmitting, from the first radio, one or more of the set of MPDUs to the recipient electronic device and on the first link; and/or retransmitting, from the second radio, the one or more of the set of MPDUs to the recipient electronic device and associated with the second link. In some embodiments, the electronic device may transition a transmit opportunity from the first link to the second link prior to retransmitting the one or more of the set of MPDUs to the recipient electronic device using the second link.

Additionally, the feedback may include: a block acknowledgment during the transmission of the PPDU that aborts the transmission of the PPDU, an indication of at least a subset of the set of MPDUs that were not received by the recipient electronic device, and/or a HARQ NACK. In some embodiments, the feedback is included in a control field of a MAC header in a block acknowledgment.

Note that the electronic device may transmit, to the recipient electronic device, a modification when the feedback is allowed. In some embodiments, the modification may be transmitted in a beacon, a probe response and/or an association response.

Moreover, a transmitter and a receiver for a given radio may be implemented using a single integrated circuit or multiple integrated circuits.

Figure 3:
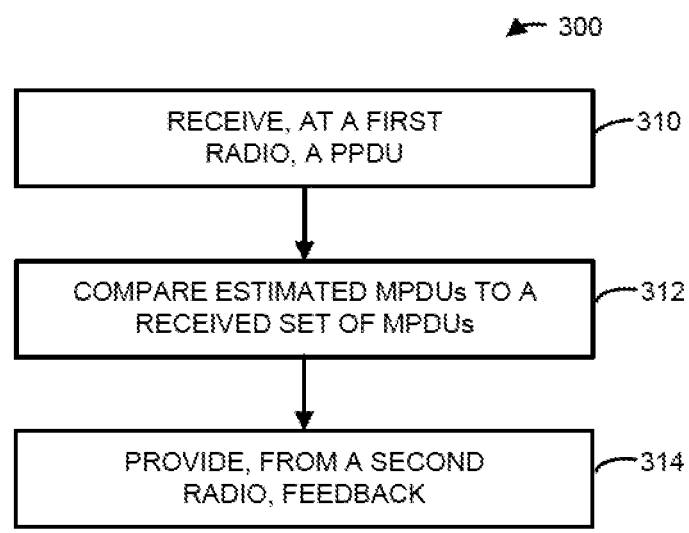
FIG. 3 is a flow diagram illustrating an example method for providing feedback using an electronic device of FIG. 1.

FIG. 3 presents a flow diagram illustrating an example method 300 for providing feedback. This method may be performed by a recipient electronic device, such as electronic device 110-1 in FIG. 1. Note that the communication with an electronic device may be compatible with an IEEE 802.11 communication protocol.

During operation, the recipient electronic device may receive, at a first radio in the recipient electronic device, a PPDU (operation 310) from the electronic device and on a first link between the electronic device and the recipient electronic device, where the PPDU includes a PPDU preamble and a set of MPDUs. Then, the recipient electronic device may compare estimated MPDUs in the set of MPDUs, which are based at least in part on the PPDU preamble, to the received set of MPDUs (operation 312). Next, the recipient electronic device may provide, from a second radio in the recipient electronic device, the feedback (operation 314) to the electronic device and on a second link between the electronic device and the recipient electronic device, where the feedback is based at least in part on the comparison.

Moreover, the feedback may be provided while the PPDU is being received. Alternatively or additionally, the feedback may be provided based at least in part on a feedback criterion. In some embodiments, the feedback may be included in a control field of a MAC header in a block acknowledgment.

Note that the feedback criterion may correspond to an access category of the PPDU. Furthermore, the feedback criterion may include one or more of: a predefined elapsed time since a start of receiving the PPDU, a predefined time duration before an end of receiving the PPDU, and/or a failed transmission time associated with at least a subset of the set of MPDUs when no MPDUs are received. In some embodiments, the feedback may include: a block acknowledgment, an indication of at least a subset of the set of MPDUs that were not received by the recipient electronic device, and/or a HARQ NACK.

Additionally, the recipient electronic device may receive, from the electronic device, a modification when the feedback is allowed. In some embodiments, the modification is received in a beacon, a probe response and/or an association response.

Moreover, the recipient electronic device may request a transmit opportunity on the second link to provide the feedback.

Furthermore, a transmitter and a receiver for a given radio may be implemented using a single second integrated circuit or multiple second integrated circuits.

In some embodiments of method 200 (FIG. 2) and/or 300 there may be additional or fewer operations. Further, one or more different operations may be included. Moreover, the order of the operations may be changed, and/or two or more operations may be combined into a single operation or performed at least partially in parallel.

Figure 4:
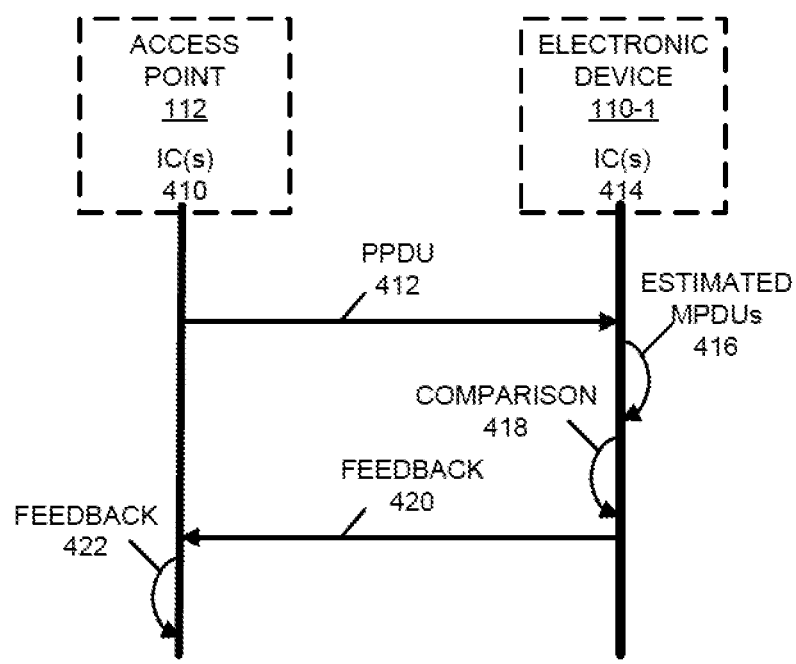
FIG. 4 is a drawing illustrating an example of communication among components in the electronic devices of FIG. 1.

The communication techniques are further illustrated in FIG. 4, which presents a flow diagram illustrating an example of communication among components in electronic device 110-1 and access point 112. During operation, one or more integrated circuits (ICs) 410 in access point 112 may transmit a PPDU 412 to electronic device 110-1 on the first link between access point 112 and electronic device 110-1, where PPDU 412 includes a PPDU preamble and a set of MPDUs.

While or after receiving PPDU 412 on the first link, one or more integrated circuits 414 in electronic device 110-1 may determine estimated MPDUs 416 in the set of MPDUs based at least in part on the PPDU preamble. Then, the one or more integrated circuits 414 may compare 418 the estimated MPDUs 416 to the received set of MPDUs in PPDU 412. Then, the one or more integrated circuits 414 may provide feedback 420 to access point 112 on a second link between access point 112 and electronic device 110-1, where feedback 420 is based at least in part on comparison 418.

After receiving feedback 420, the one or more integrated circuits 410 may perform a remedial action 422 based at least in part on feedback 420. For example, the one or more integrated circuits 410 may abort or terminate the current transmission of PPDU 412 and/or may retransmit PPDU 412.

In summary, the communication techniques may allow electronic devices 110 and access point 112 to avoid wasted transmission time associated with transmission of MPDUs that electronic devices 110 are unable to receive and/or to have faster retransmission using multi-link transmissions. Therefore, the communication techniques may reduce transmission delays and/or may improve transmission throughputs. Consequently, the communication techniques may improve the communication performance of electronic devices 110 and access point 112.

While communication between the components in FIG. 4 are illustrated with unilateral or bilateral communication (e.g., lines having a single arrow or dual arrows), in general a given communication operation may be unilateral or bilateral.

Figure 5:
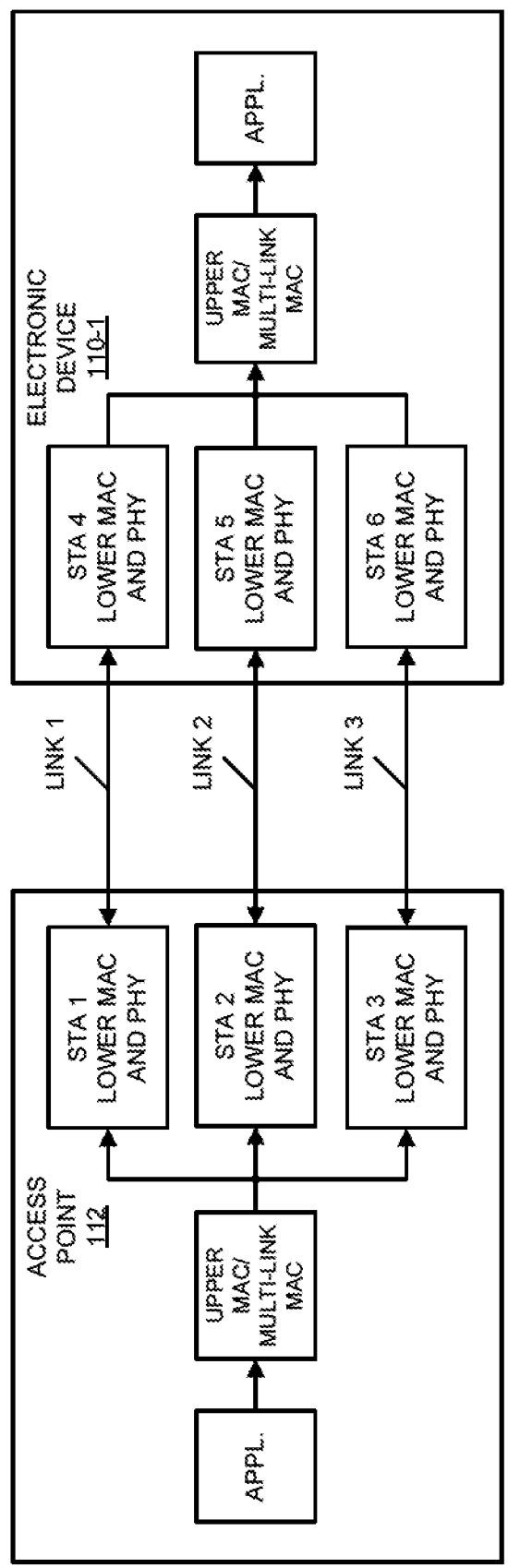
FIG. 5 is a drawing illustrating an example of communication between electronic devices of FIG. 1.
Figure 6:
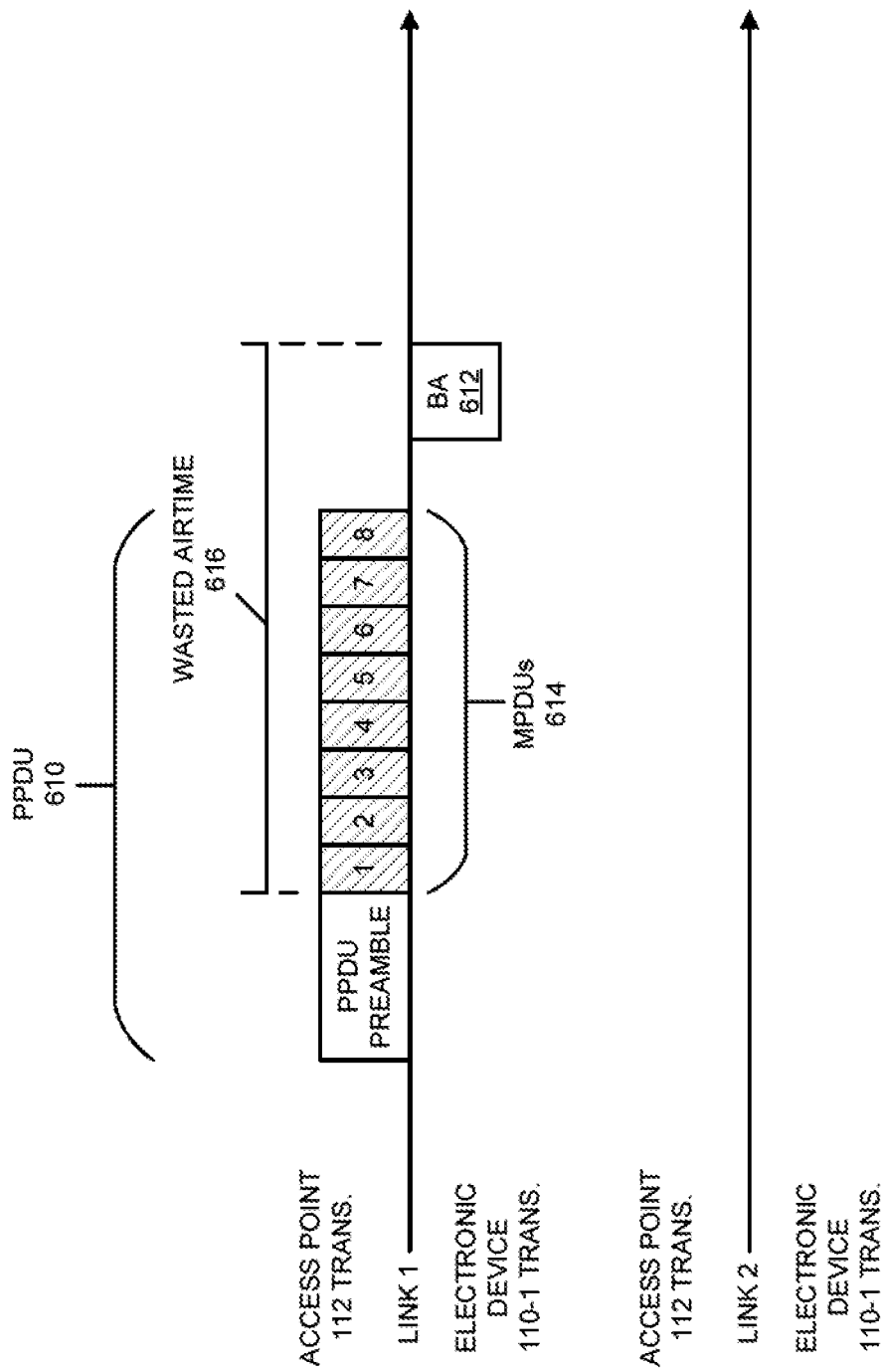
FIG. 6 is a drawing illustrating an example of communication between electronic devices of FIG. 1.

In some embodiments, the communication techniques facilitate more efficient communication using multiple concurrent links. This is illustrated in FIG. 5, which presents a drawing illustrating an example of communication between access point 112 and electronic device 110-1. (While communication between access point 112 and electronic device 110-1 is used as an illustration in the discussion that follows, more generally the communication techniques may be used during communication between other electronic devices, such as electronic devices 110-1 and 110-2.) Moreover, as shown in FIG. 6, which presents a drawing illustrating an example of communication between access point 112 and electronic device 110-1, even though electronic device 110-1 may detect that MPDU reception is not likely during communication of a PPDU 610 from access point 112 (such as at MPDU 3), in the current block acknowledgment approach electronic device 110-1 may not be able to inform access point 112 until the end of PPDU 610 (such as via block acknowledgment or BA 612). For example, block acknowledgment 612 may indicate that MPDUs 614 (such as MPDUs 1-8) were not received. (In the figures, MPDUs that are not received are indicated with diagonal hash marks.) However, this delay in informing access point 112 may result in wasted airtime 616.

Figure 7:
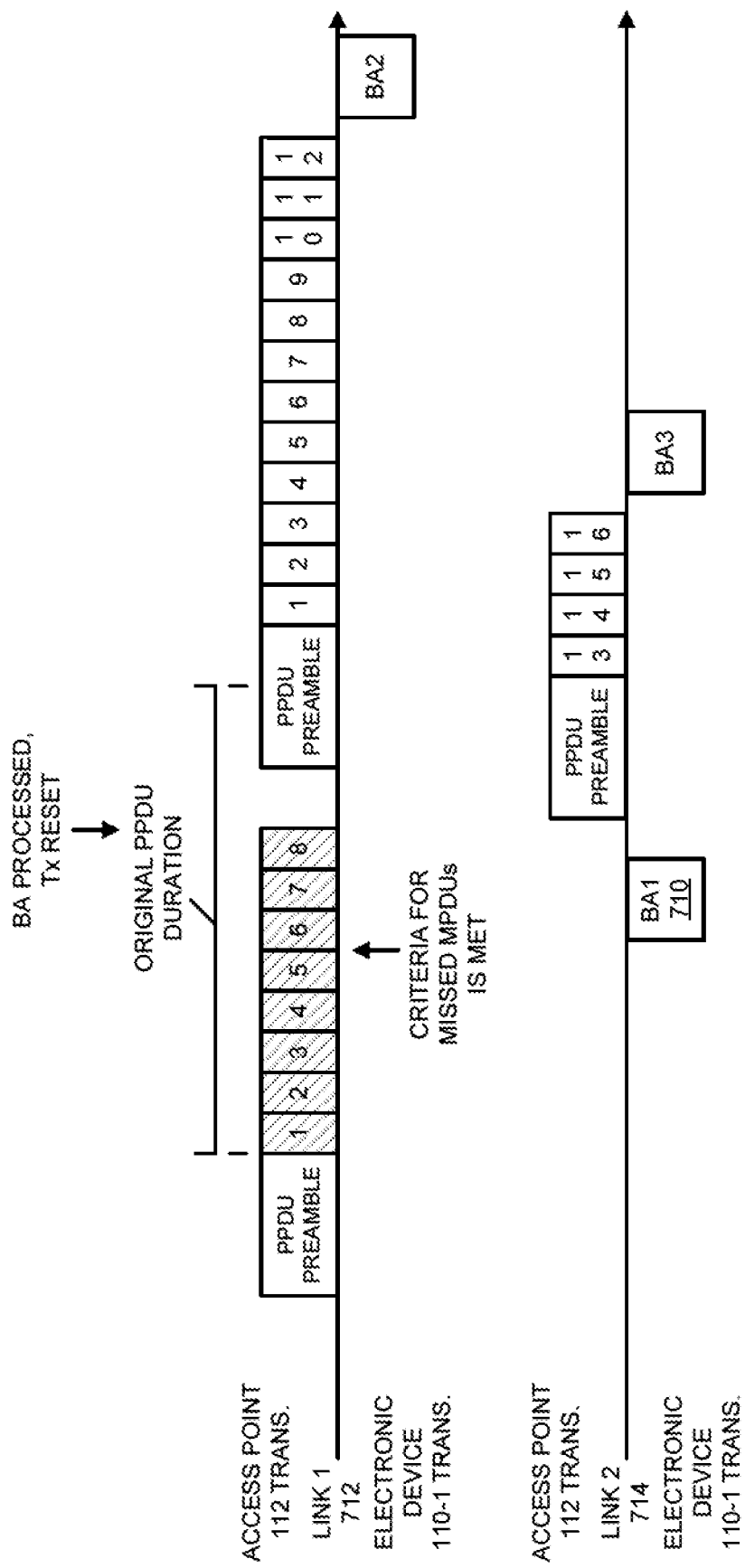
FIG. 7 is a drawing illustrating an example of communication between electronic devices of FIG. 1.

As shown in FIG. 7, which presents a drawing illustrating an example of communication between access point 112 and electronic device 110-1, in the communication techniques a receiver may transmit a fast block acknowledgment BA1 710 or indication in another link during an ongoing PPDU transmission to indicate that no MPDUs or very few MPDUs in the PPDU are received. For example, a PPDU preamble may be received on link 1 712, but no MPDUs may be received. More generally, the receiver may have one or more preconfigured criteria when a block acknowledgment or indication on another link is transmitted.

In some embodiments, instead of block acknowledgment BA1 710, a frame in the other link can indicate a receive failure through or using an A-Control field of a media access control header. This block acknowledgment frame may instruct the transmitter: to abort the ongoing PPDU transmission and to retransmit the PPDU in link 1 712 and/or to retry the PPDU transmission in link 1 712; to use transmission resources in link 2 714 for the MPDU retransmissions; or both abort and retry on link 1 712 and use additional transmission time in link 2 714 for retransmissions. In some embodiments, access point 112 may reset a transmission when block acknowledgment BA1 710 as is received.

Figure 8:
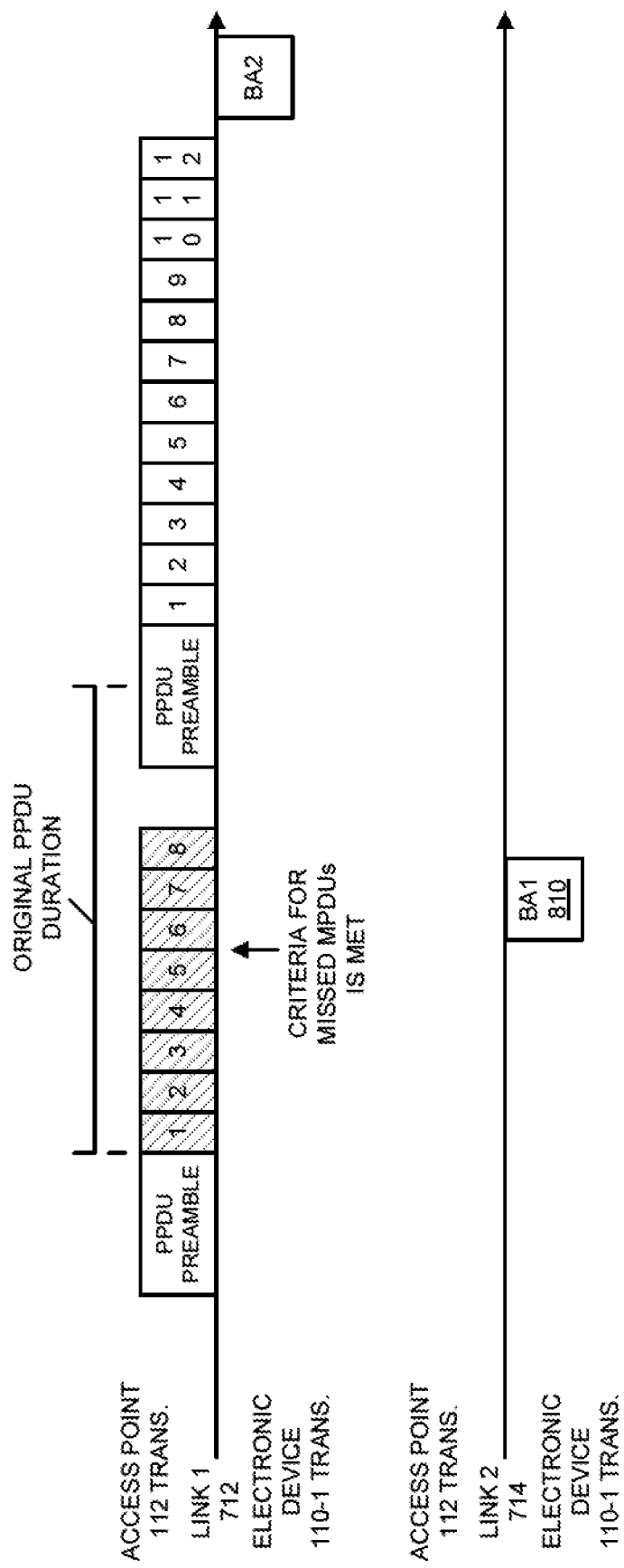
FIG. 8 is a drawing illustrating an example of communication between electronic devices of FIG. 1.

For example, as shown in FIG. 8, which presents a drawing illustrating an example of communication between access point 112 and electronic device 110-1, the communication techniques may provide several benefits. Notably, instead of spending 3.96 ms to transmit the failing PPDU, the retransmission may be started 0.356 ms after the preamble transmission. Consequently, 3.6 ms (90%) of the PPDU transmission time may be saved.

Thus, access point 112 may transmit a 4 ms long PPDU in a 5 GHz link. The transmission rate may be 1 Gbit/s (80 MHz, 2 spatial streams). Moreover, electronic device 110-1 may receive the preamble (40 µs), but may not be able to receive the MPDUs. 240 µs after the preamble reception, electronic device 110-1 may send a block acknowledgment BA1 810 in a 2.4 GHz link. Within 240 µs, electronic device 110-1 should have received in link 1 712 approximately 20 MPDUs with a size of 1500 octets. However, electronic device 110-1 did not receive any MPDUs, so electronic device 110-1 may abort the PPDU transmission by sending block acknowledgment BA1 810 (50 µs) in link 2 714. Note that the 2.4 GHz link transmission rate may be 150 Mbit/s, (20 MHz, 1 spatial stream), while block acknowledgment BA1 810 is transmitted at a lower rate to ensure correct reception. Moreover, electronic device 110-1 may not allocate transmission time in link 2 714 for access point 112. The transmission rate in link 2 714 may be so low that it does not have big impact of the total transmission time. Furthermore, when access point 112 receives the block acknowledgment BA1 810, it may stop transmitting MPDUs (10 µs) and, after a short interframe space or SIFS (16 µs), access point 112 may retransmit the PPDU using link 1 712.

Figure 9:
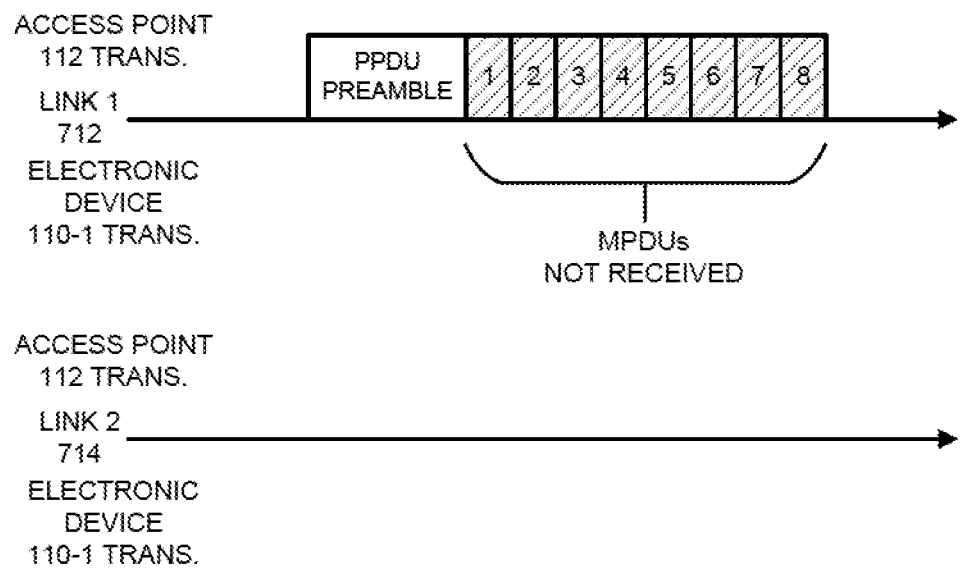
FIG. 9 is a drawing illustrating an example of communication between electronic devices of FIG. 1.
Figure 10:
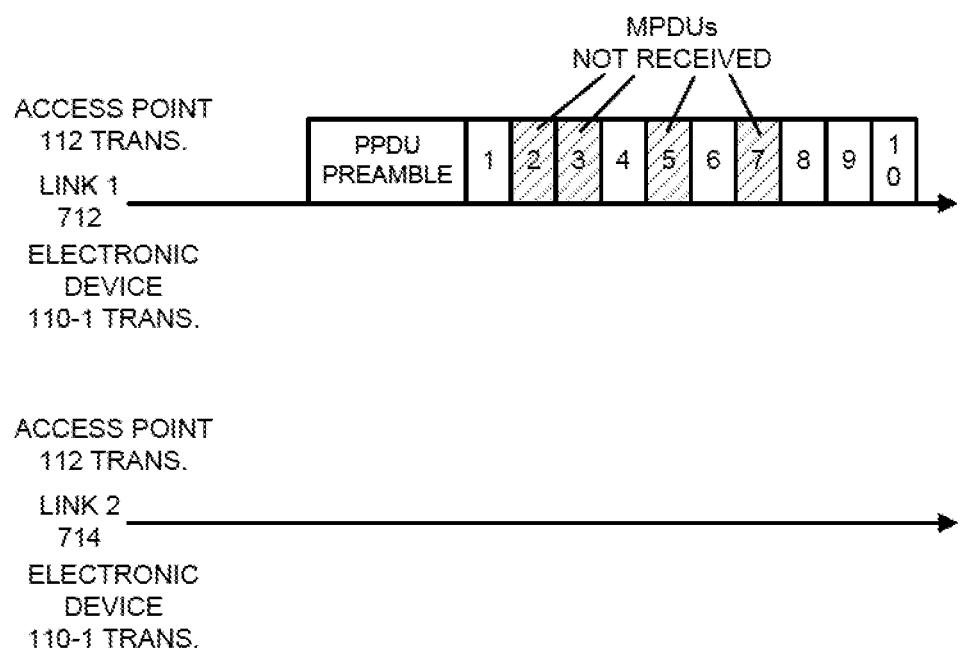
FIG. 10 is a drawing illustrating an example of communication between electronic devices of FIG. 1.

Moreover, as shown in FIG. 9, which presents a drawing illustrating an example of communication between access point 112 and electronic device 110-1, electronic device 110-1 may be able to detect failed MPDUs in a PPDU that is addressed to it. For example, a receiver, electronic device 110-1, may receive the preamble in or using link 1 712 and the preamble may signal that electronic device 110-1 is the receiver of the PPDU. However, the receiver may not be able to receive the transmitted MPDUs. Notably, the preamble may identify the receiver, e.g., the device identifier or association identifier may be included in the preamble. Moreover, the preamble may indicate the duration of the transmitted PPDU and the modulation, coding, bandwidth and/or the number of spatial streams for the data transmission. In some embodiments, the preamble is transmitted using a robust modulation coding scheme (MCS), so that it can be received even when there is high interference or a poor link. In contrast, the MPDUs may be encoded with modulation, coding and/or a number of spatial streams that require a better link condition. Consequently, the receiver, electronic device 110-1, may detect that it is not receiving MPDUs or that it receives only few MPDUs (as shown in FIG. 10, which presents a drawing illustrating an example of communication between access point 112 and electronic device 110-1), and that the transmission has periods when no MPDUs are received. Because electronic device 110-1 is identified as the receiver, it may know or may be able to estimate the failed transmissions. For example, using the information in the PPDU preamble, the receiver may estimate or calculate that it is missing or has not received one or more MPDUs.

Note that a receiver may be selectively allowed to report failed MPDUs or a failed PPDU. For example, as described further below, each station or recipient electronic device (such as electronic device 110-1) may have a default configuration when a block-acknowledgment transmission in a secondary channel or link is allowed. In some embodiments, an electronic device (such as access point 112 or a 'transmitter') may change the default parameters by signaling in, e.g., a beacon, a probe response and/or an association response the one or more criteria when the block-acknowledgment transmission during ongoing transmit opportunity (TXOP) is allowed. The one or more criteria may be access-category (AC) specific. For example, only a high access-category transmit opportunity may be allowed to use or to transmit a block acknowledgment on the other channel or link. Note that the transmitter may selectively disable the capability to receive or provide a fast retransmission indication on or using the other channel or link. In this case, the indication may not be transmitted.

Figure 11:
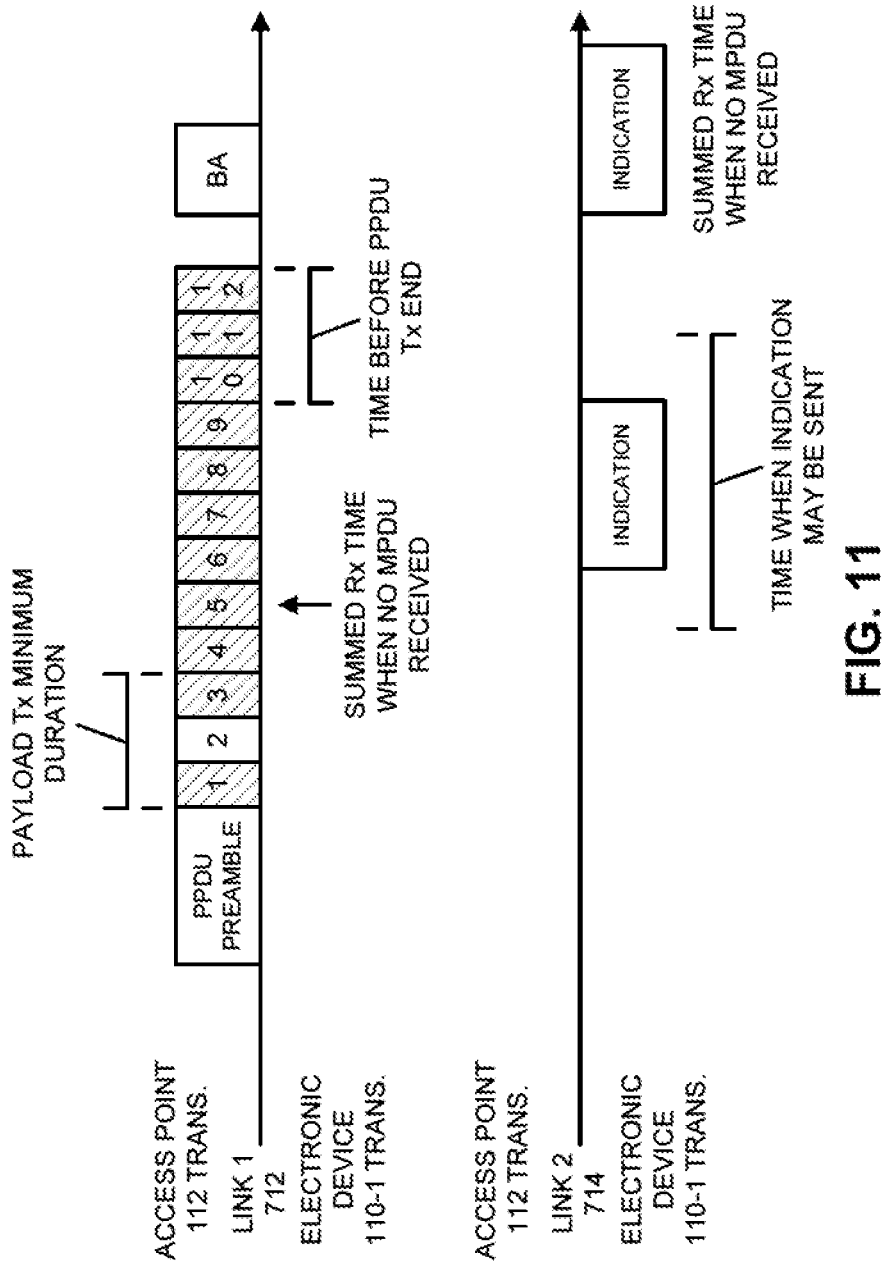
FIG. 11 is a drawing illustrating an example of communication between electronic devices of FIG. 1.

Furthermore, as shown in FIG. 11, which presents a drawing illustrating an example of communication between access point 112 and electronic device 110-1, a receiver may transmit the indication about failed MPDUs if the one or more criteria are met. Notably, a station (such as electronic device 110-1) that has received a PPDU and knows that it is the receiver may send an indication in another channel or link to indicate a failed PPDU transmission, if one or more of the following criteria are met. Notably, the station may have waited a first minimum duration (e.g., measured from the end of the PPDU preamble) after which the indication may be transmitted in the other channel or link. Alternatively or additionally, the indication transmission may end at least a second minimum duration before the ongoing PPDU transmission (e.g., which may be measured from the end of the PPDU). If the indication cannot be transmitted before this time, the receiver may cancel its transmission or transmit the indication at the same time as a block acknowledgment for the transmitted PPDU. In some embodiments, the station may sum the failed transmission time, when no MPDU has been received. If the failed transmission time is longer than a threshold, a block acknowledgment may be sent. Note that the he failed transmission time may not be continuous. Moreover, the failed transmission time may be calculated as a function of transmission rates. For example, the failed transmission time may be configured to be able to receive at least five 1500-byte-long MPDUs. Furthermore, the receiver may transmit the indication if it is started at the same time as a block acknowledgment in the link in which the data was transmitted. The simultaneous indication may be transmitted if the sum of failed MPDU transmission time is larger than a threshold.

Figure 12:
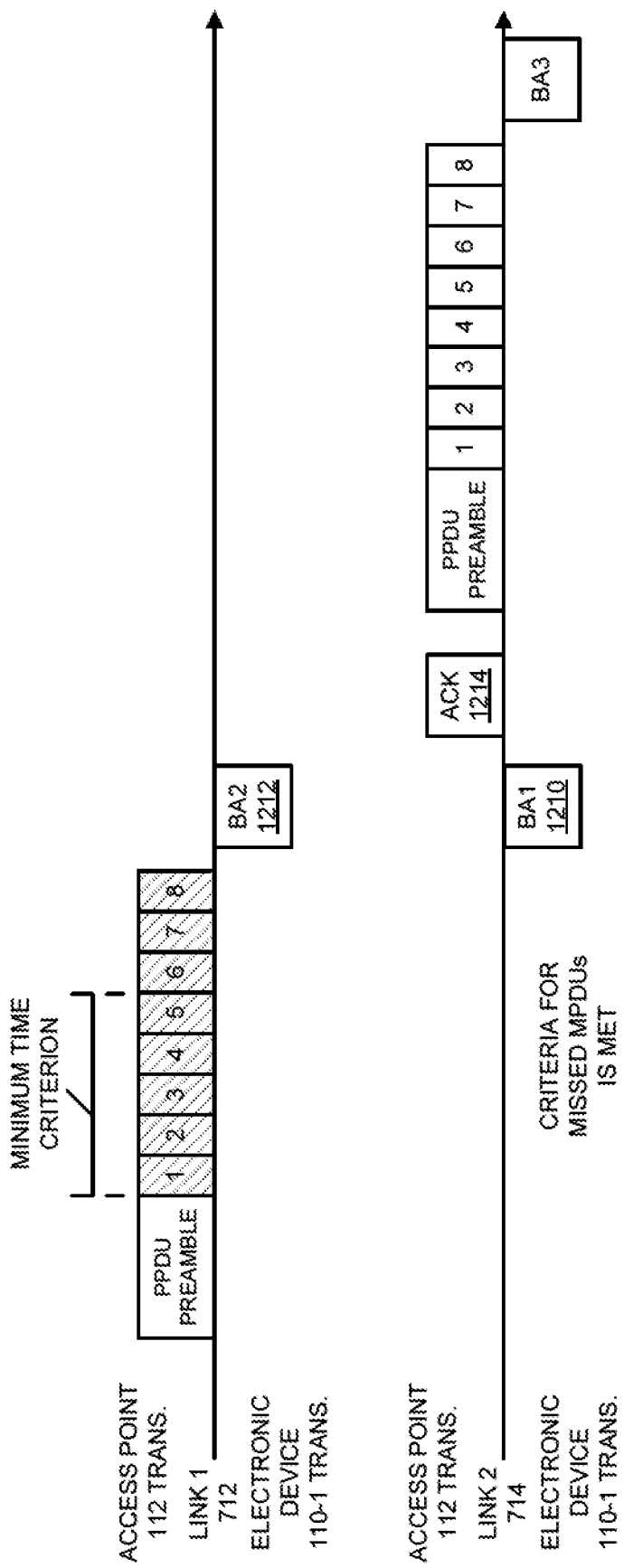
FIG. 12 is a drawing illustrating an example of communication between electronic devices of FIG. 1.

As shown in FIG. 12, which presents a drawing illustrating an example of communication between access point 112 and electronic device 110-1, a block acknowledgment may be selectively sent on a second channel or link. Notably, a station (such as electronic device 110-1) may obtain a transmit opportunity to send an indication or a block acknowledgment in another channel or link. For example, an Enhanced Distributed Channel Access (EDCA) may be used to obtain the transmit opportunity in link 2 714. The access category of the transmission may be the primary access category of the transmit opportunity in link 1 712. Note that this may be the only time when a block acknowledgment may initiate an EDCA transmit opportunity, e.g., if a PPDU transmission is not ongoing in the other link, a transmit opportunity may not be initiated by a block acknowledgment Thus, in some embodiments, the data transmitter may not be capable of retransmitting the PPDU frames in the other link during the ongoing PPDU transmission. Moreover, the receiver may be configured to only send a block acknowledgment BA1 1210 or an indication when it is sending a block acknowledgment BA2 1212 that is scheduled in the same channel Furthermore, electronic device 110-1 may remain with an EDCA backoff value of, e.g., 0 to ensure that the station meets the criteria to send a block acknowledgment on second link or until the block acknowledgment BA1 1210 transmission time. For example, electronic device 110-1 may desire to report all received MPDUs of the PPDU in block acknowledgment BA1 1210.

In some embodiments, a station may be able to transmit on one link and receive on another link. The transmitting and receiving may occur concurrently.

Note that in some embodiments of FIG. 12 (as well as other embodiments of the communication techniques), access point 112 may optionally provide an acknowledgment (ACK) 1214 when block acknowledgment BA1 1210 is received.

Moreover, a transmitter (such as access point 112) may have several possible actions or remedial actions when it receives a PPDU reception failure indication. Notably, a block acknowledgment that is transmitted in link 2 714 during a PPDU transmission in link 1 712 may: request that the ongoing PPDU transmission is aborted and the transmitter retries the PPDU transmission; allocate transmission time for retransmissions or indicate that link 2 714 should not be used for retransmissions; and/or indicate whether reception of all MPDUs has failed.

Figure 13:
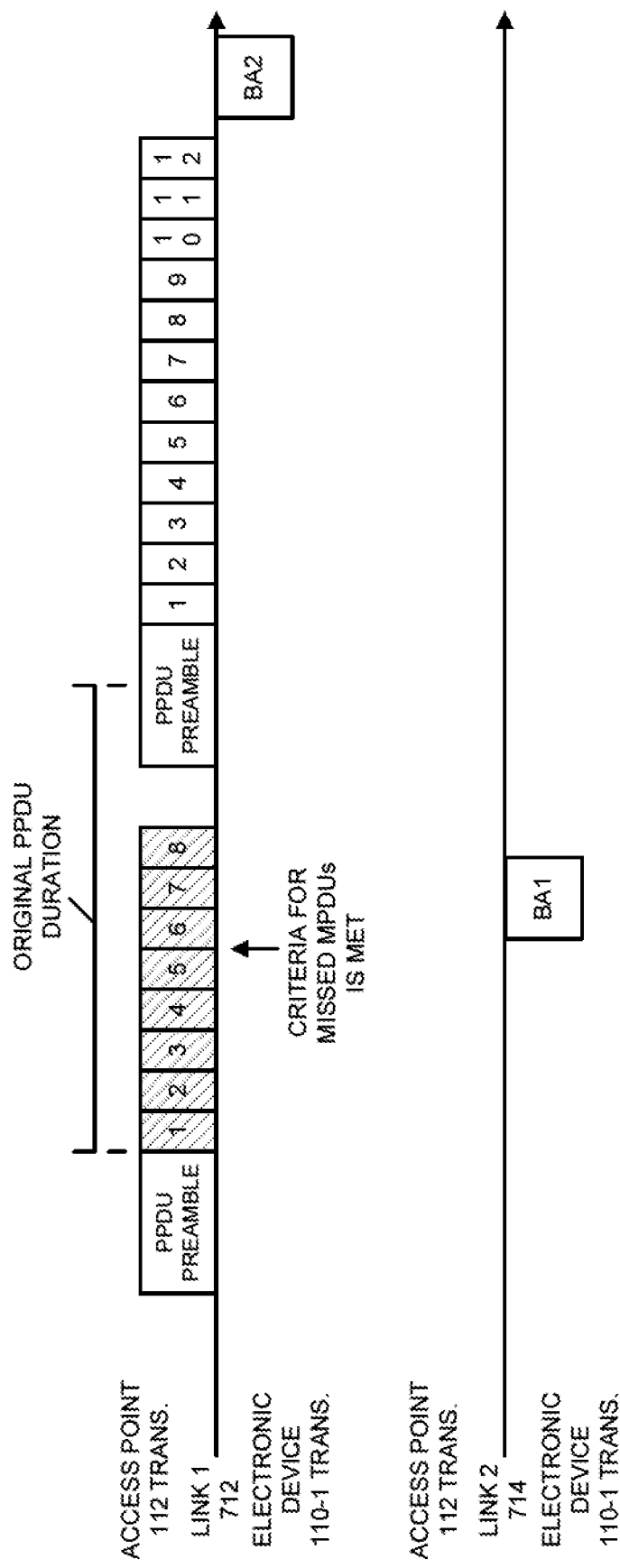
FIG. 13 is a drawing illustrating an example of communication between electronic devices of FIG. 1.
Figure 14:
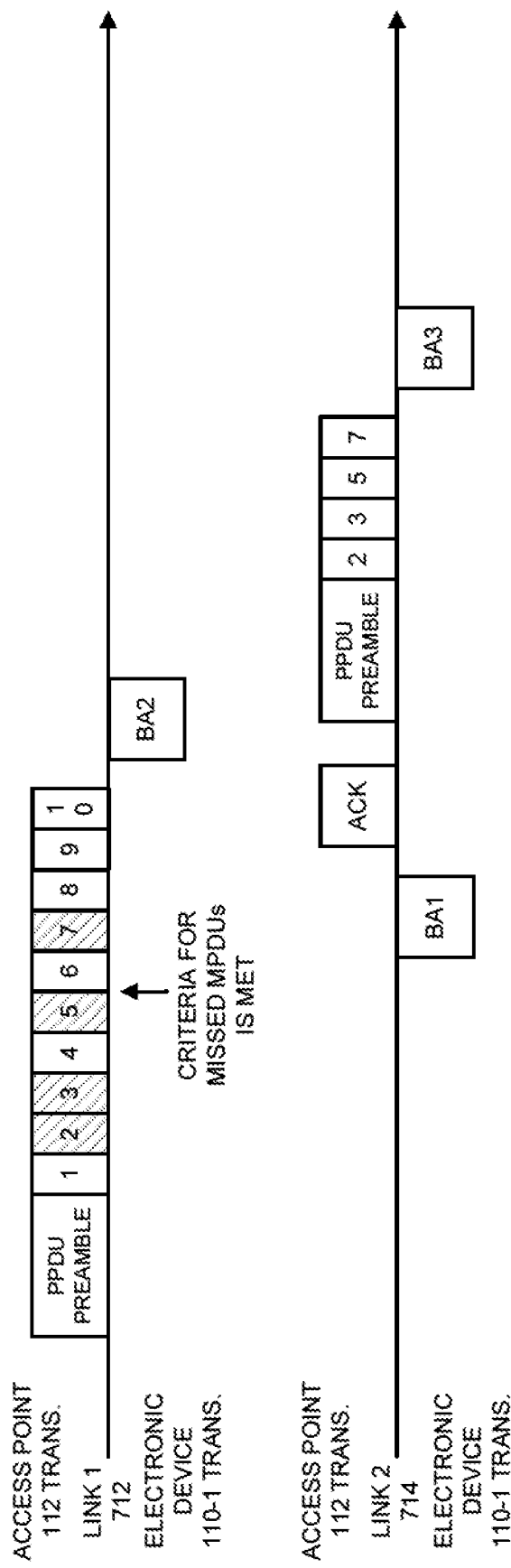
FIG. 14 is a drawing illustrating an example of communication between electronic devices of FIG. 1.
Figure 15:
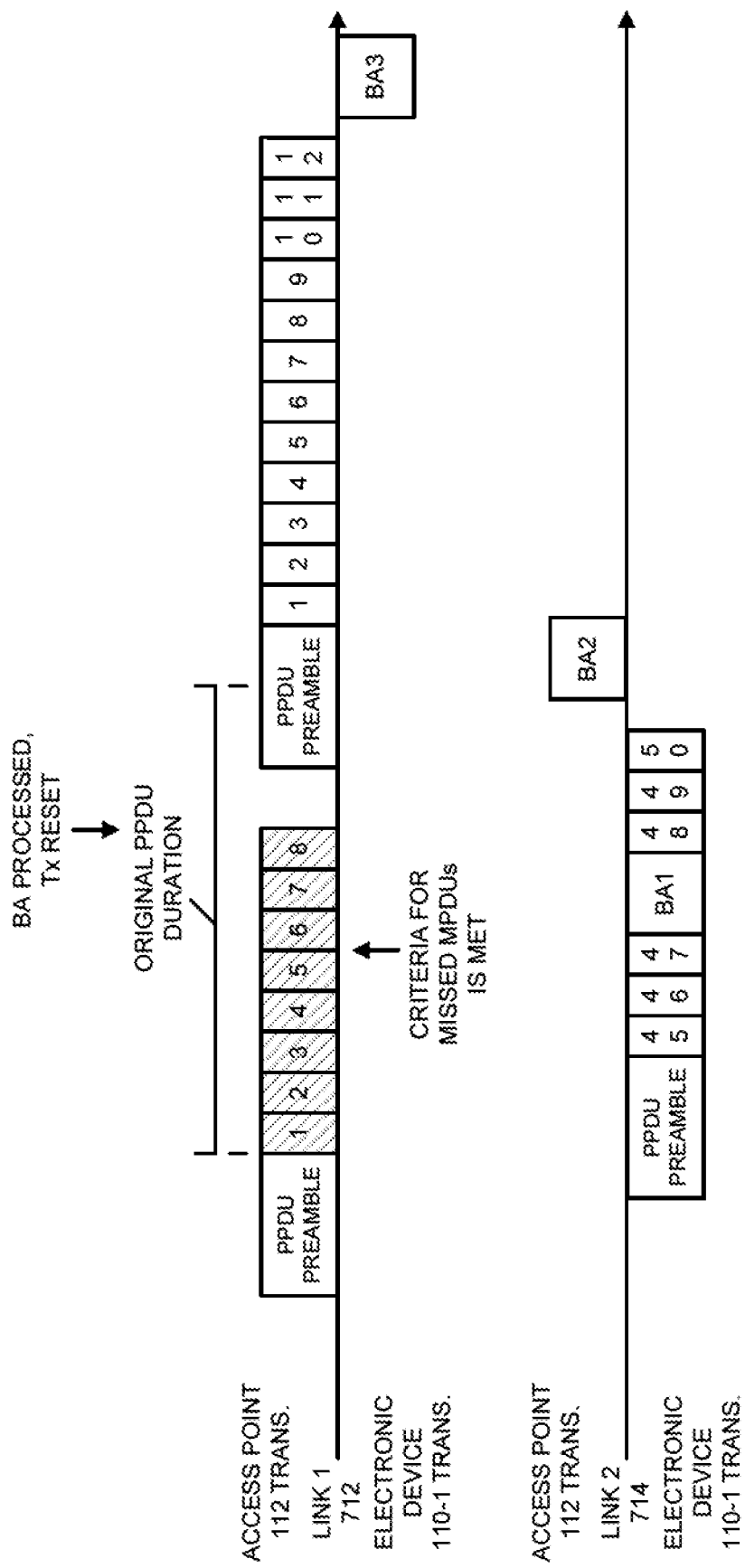
FIG. 15 is a drawing illustrating an example of communication between electronic devices of FIG. 1.

For example, as shown in FIG. 13, which presents a drawing illustrating an example of communication between access point 112 and electronic device 110-1, access point 112 may perform a fast transmission abort and then may perform a retry on link 1 712. Alternatively, as shown in FIG. 14, which presents a drawing illustrating an example of communication between access point 112 and electronic device 110-1, transmission time may be allocated on link 2 714. Furthermore, as shown in FIG. 15, which presents a drawing illustrating an example of communication between access point 112 and electronic device 110-1, in some embodiments a retransmission time on link 2 714 may not be reserved.

Figure 16:
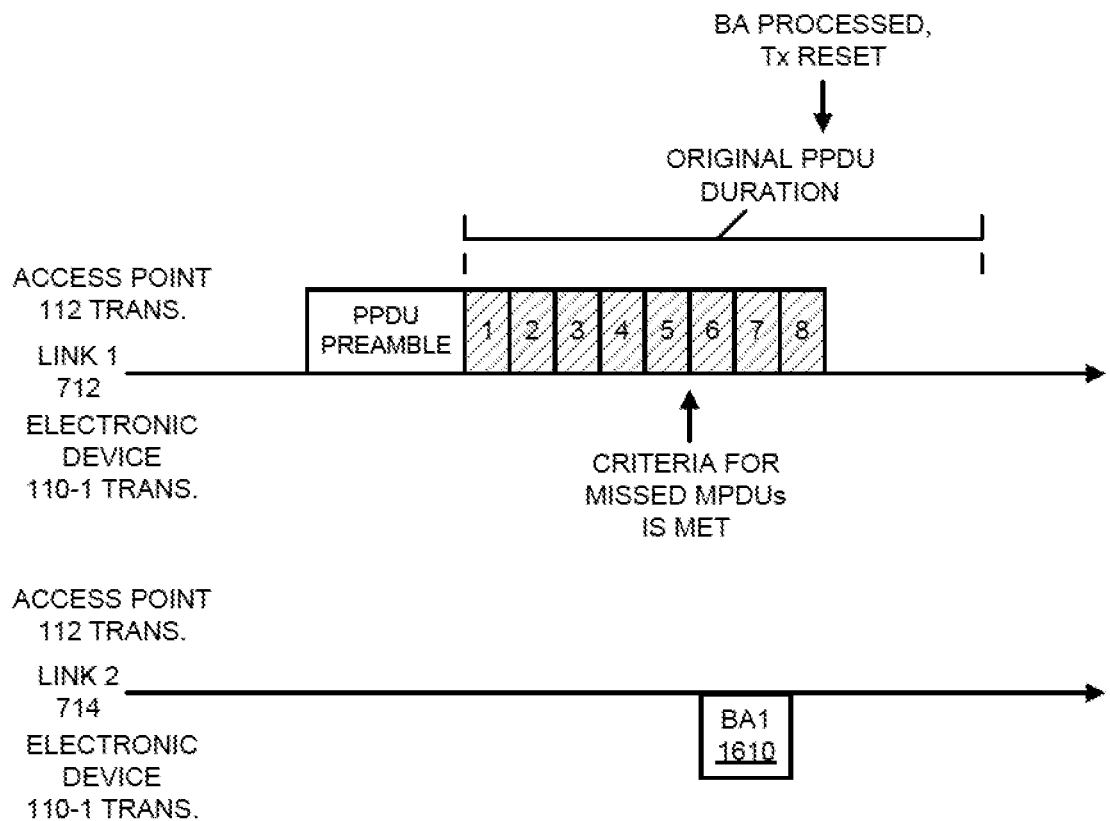
FIG. 16 is a drawing illustrating an example of communication between electronic devices of FIG. 1.
Figure 17A:
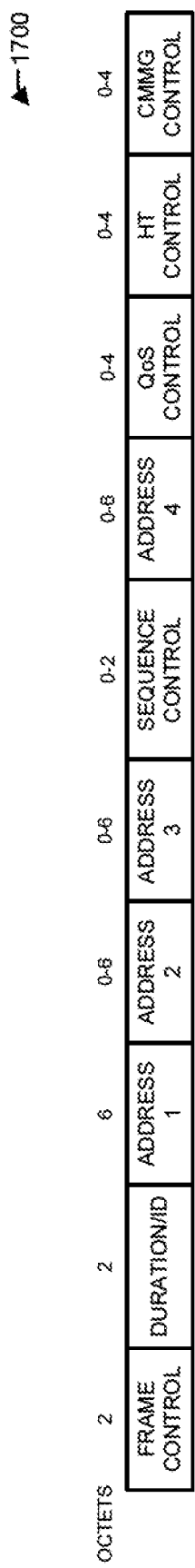
FIG. 17A is a drawing illustrating an example of a media access control (MAC) header in a block acknowledgment communicated between electronic devices of FIG. 1.

In some embodiments, when one or more criteria for missed MPDUs are met and a block acknowledgment is provided (as shown in FIG. 16, which presents a drawing illustrating an example of communication between access point 112 and electronic device 110-1), information about failed MPDUs or a failed PPDU may be conveyed in an A-Control field of a MAC header of a frame, such as block acknowledgment 1610. This is shown in FIG. 17A, which presents a drawing illustrating an example of a MAC header 1700 in a block acknowledgment communicated between electronic device 110-1 and access point 112. Note that after MAC header 1700, the block acknowledgment may include a frame body and a frame check sequence. Moreover, Table 1 provides a high throughput (HT) control field format.

TABLE 1

| Variant | B0 | B1 | B2-B29 | B30 | B31 |
|---|---|---|---|---|---|
| HT | 0 | | HT Control Middle | AC Constraint | RDG/More PPDU |
| VHT | 1 | 0 | VHT Control Middle | AC Constraint | RDG/More PPDU |
| HE | 1 | 1 | A-Control | | |

Notably, block acknowledgment 1 BA1 1610 may include a 'Fast Response' A-Control field in the HT control field in MAC Header 1700 (e.g., with a high-efficiency or HE variant). This A-Control field may be transmitted in a frame that reports the failed PPDU in the other link. Note that one response frame may include multiple Fast Response A-Control fields, e.g., one per reported ongoing transmission.

Figure 17B:
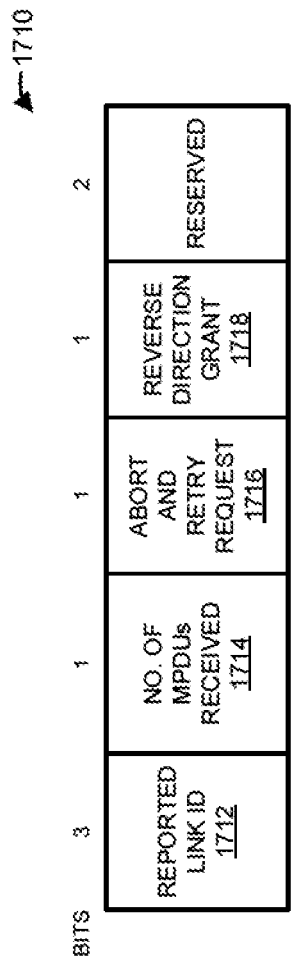
FIG. 17B is a drawing illustrating an example of a Fast-Response A-Control field in the MAC header of FIG. 17A.

As shown in FIG. 17B, which presents a drawing illustrating an example of Fast-Response A-Control field 1710, this field may include some or all of the following information: a reported link identifier (ID) field 1712 that identifies the link in which poor performing PPDU transmission is ongoing; the number of MPDUs received field 1714 may be set, e.g., to '1' to indicate that the reporting station has not received any MPDUs in the ongoing PPDU transmission in the link identified by link identifier, and otherwise this field may, e.g., be set to '0'; an abort and retry requested field 1716 may be set, e.g., to '1' to indicate that the receiver requests that the PPDU transmission in the link identified by the link identifier field is aborted and that the PPDU transmission is retried immediately; and/or a reverse direction grant 1718 may be set, e.g., to '1' to indicate that the receiver is allowed to operate as transmit-opportunity holder for the remaining transmit opportunity. In some embodiments, if the indication is transmitted in a block acknowledgment, similar information as may be included in the "Fast Response" A-Control frame may be added to the block-acknowledgment control field. In order to avoid or prevent unnecessary MPDU retransmissions, the received MPDUs in the ongoing PPDU transmission may be indicated. Furthermore, a link-specific MPDU status may be indicated in a block acknowledgment, e.g., a block-acknowledgment transmitted in link 2 714 may contain the status of received MPDUs in link 2 714.

Furthermore, as shown in FIG. 8, a data transmitter (such as access point 112) may abort and retry an ongoing PPDU transmission. Notably, a data transmitter may abort and retry a PPDU transmission if it receives an indication on another link indicating that the transmission has failed. In some embodiments, the abort and retry bit may, e.g., be set to '1' in an indication to allow the transmitter to abort and retry. However, the transmitter may be allowed to continue the PPDU transmission without aborting the transmission.

If access point 112 aborts the transmission, then access point 112 may perform a clear channel assessment (CCA) energy detection (ED) to detect that link 1 712 is idle (such as, e.g., a threshold of −62 dBm), during a SIFS or, in some embodiments, during a PCF interframe space (PIFS) following the transmission of the PPDU before it retries the PPDU transmission. The retransmitted PPDU may have a lower transmission rate to ensure delivery of the MPDUs. Moreover, the retransmitted PPDU may have different content than the original PPDU.

In some embodiments, access point 112 may be allowed to abort a PPDU transmission if the PPDU has one recipient. Consequently, a multi-user PPDU transmission with more than one receiver or recipient may not be aborted. Moreover, a high efficiency trigger-based (TB) PPDU transmission in response to a trigger frame that solicited data from more than one station may not be aborted.

Figure 18:
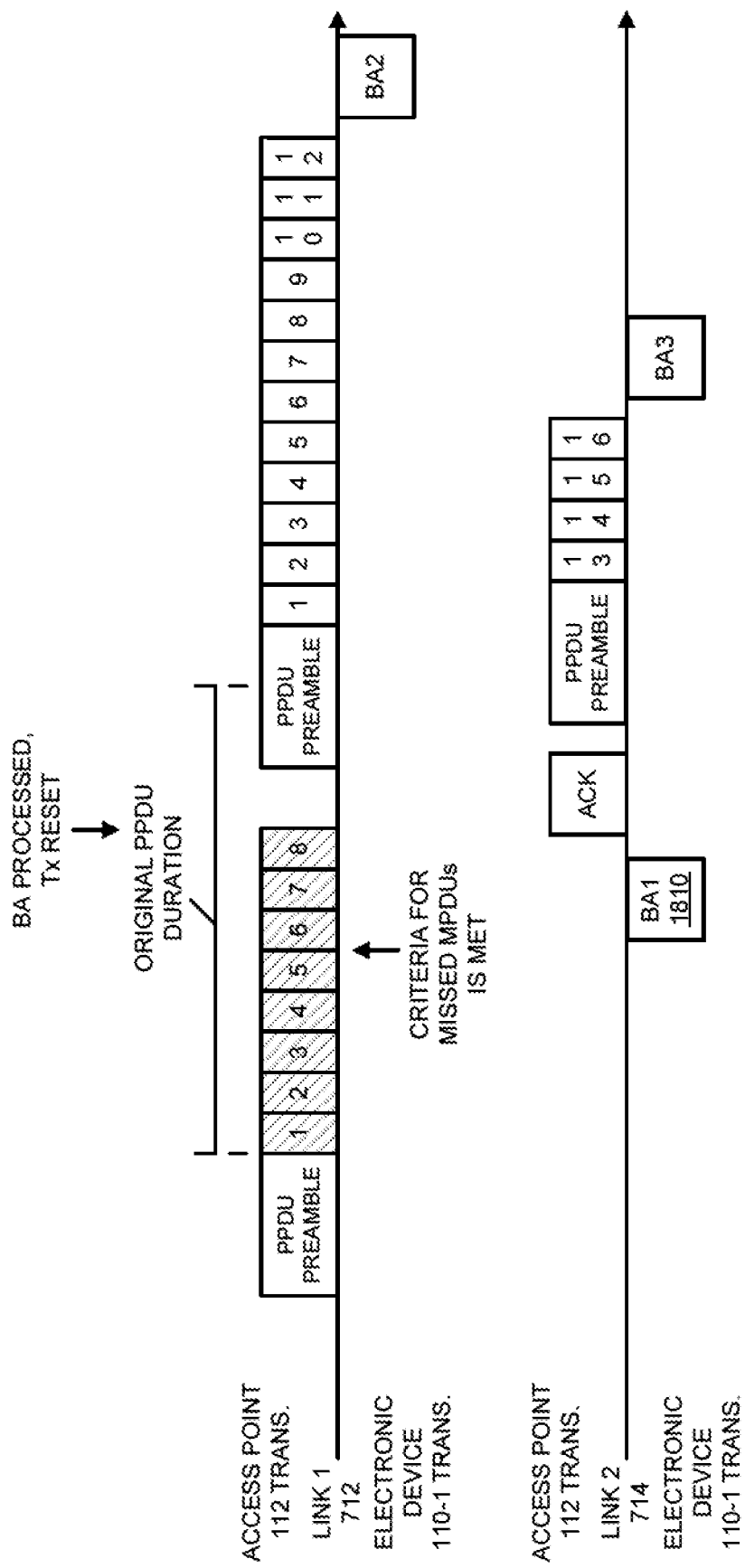
FIG. 18 is a drawing illustrating an example of communication between electronic devices of FIG. 1.

As shown in FIG. 18, which presents a drawing illustrating an example of communication between access point 112 and electronic device 110-1, abort and fast retry transmission as well as a TXOP on another link may be combined. Notably, a data transmitter (such as access point 112) may become an owner of a transmit opportunity. For example, a receiver may need to send an indication and the indication may indicate that a transmitter may become the TXOP owner, if: the reverse direction grant field in the Fast Response A-Control field is, e.g., '1'; and/or the duration field of the block acknowledgment frame is greater than, e.g., '0'. In response, the transmitter may acknowledge the block acknowledgment 1 BA1 1810. This may provide time for transmitter to prepare the transmission to link 2 714.

Figure 19:
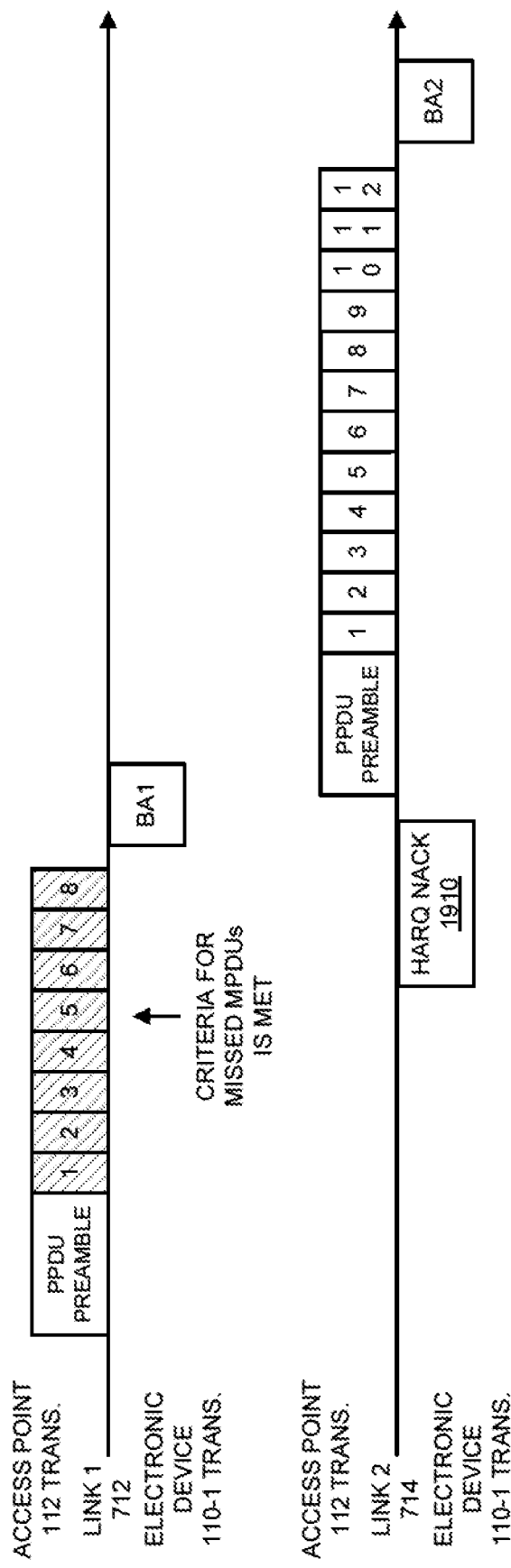
FIG. 19 is a drawing illustrating an example of communication between electronic devices of FIG. 1.

Additionally, as shown in FIG. 19, which presents a drawing illustrating an example of communication between access point 112 and electronic device 110-1, a HARQ NACK 1910 may indicate a reception failure in another link. IEEE 802.11be may define a HARQ that allows a station (such as electronic device 110-1) to detect whether low-density parity-check (LDPC) codeword reception has failed. The receiver may use the parity bits of one or more LDPC codewords or an additional physical level checksum to detect the correctness of one or more LDPC codewords.

If access point 112 and electronic device 110-1 are HARQ capable, electronic device 110-1 may transmit HARQ NACK 1910 in link 2 714 to indicate failed receptions of one or more codewords in link 1 712. HARQ NACK 1910 may be transmitted during the ongoing PPDU transmission or at the block-acknowledgment transmission time. Moreover, HARQ NACK 1910 may indicate the one or more failed codewords. The frame or PPDU may allocate a transmission time to retransmit the one or more failed codewords. Note that the HARQ may combine the originally transmitted codewords and the retransmitted codewords. The combined codewords may be more likely to be received.

Thus, HARQ NACK 1910 may be used to indicate a reception failure on another link (instead of using an indication or a block acknowledgment). In HARQ NACK 1910, one or more codewords may be used to indicate reception or failed reception.

In summary, the embodiments of the communication techniques may allow fast retransmission using multi-link transmissions. These communication techniques may avoid wasted transmission time for a transmitter to transmit MPDUs that are not possible to receive. Moreover, the faster retransmission may reduce transmission delays and/or may improve transmission throughputs. Consequently, the communication techniques may improve the communication performance of the electronic device and the recipient electronic device.

In some embodiments, a WLAN transmission may include: a preamble (which may be transmitted with a most robust modulation coding scheme); one or more instances of an A-MPDU subframe header for an MPDU, an MPDU, and one or more MPDU delimiters/padding; and an end-of-frame padding. A physical layer may encode all transmissions to low-density parity-check codewords (CWs). For example, the content of a frame after the preamble may be included in 17 codewords. Moreover, the physical layer may check, using the low-density parity-check codewords coding, the most likely content for received codewords.

Furthermore, a HARQ/NACK may be transmitted between a first transmission (such as a first PPDU or frame) and a second transmission. Then, a block acknowledgment may be transmitted after the second transmission.

The HARQ may include a check sum between multiple X, where X is an integer, codewords. The checksum may verify the correctness of these codewords. Additionally, the physical layer may decode the data bits from the low-density parity-check codewords, and may feed the bitstream to the media access control layer. The medial access control layer may parse MPDUs from the bit stream received from the physical layer. These MPDUs may have checksums that are used to verify the correct reception of the MPDUs.

Note that a HARQ transmission may store all failed transmissions and may combine the retransmission with the original transmission. Thus, in the preceding example, the first transmission and the second transmission may be combined into a single combined transmission. The combined transmission may be more likely to be received.

Note that the formats of packets or frames communicated during the communication techniques may include more or fewer bits or fields. Alternatively or additionally, the position of information in these packets or frames may be changed. Thus, the order of the fields may be changed.

While the preceding embodiments illustrate embodiments of the communication techniques using frequency sub-bands, in other embodiments the communication techniques may involve the concurrent use of different temporal slots, and/or or a combination of different frequency sub-bands, different frequency bands and/or different temporal slots.

Moreover, while the preceding embodiments illustrated the use of Wi-Fi during the communication techniques, in other embodiments of the communication techniques Bluetooth or Bluetooth Low Energy is used to communicate at least a portion of the information in the communication techniques. Furthermore, the information communicated in the communication techniques may be communicated may occur in one or more frequency bands, including: 900 MHz, a 2.4 GHz frequency band, a 5 GHz frequency band, a 6 GHz frequency band, a 60 GHz frequency band, a Citizens Broadband Radio Service (CBRS) frequency band, a band of frequencies used by LTE, etc.

As described herein, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

We now describe embodiments of an electronic device. FIG. 20 presents a block diagram of an electronic device 2000 (which may be a cellular telephone, a smartwatch, an access point, a wireless speaker, an IoT device, another electronic device, etc.) in accordance with some embodiments. This electronic device includes processing subsystem 2010, memory subsystem 2012 and networking subsystem 2014. Processing subsystem 2010 includes one or more devices configured to perform computational operations. For example, processing subsystem 2010 can include one or more microprocessors, application-specific integrated circuits (ASICs), microcontrollers, graphics processing units (GPUs), programmable-logic devices, and/or one or more digital signal processors (DSPs).

Memory subsystem 2012 includes one or more devices for storing data and/or instructions for processing subsystem 2010, and/or networking subsystem 2014. For example, memory subsystem 2012 can include dynamic random access memory (DRAM), static random access memory (SRAM), a read-only memory (ROM), flash memory, and/or other types of memory. In some embodiments, instructions for processing subsystem 2010 in memory subsystem 2012 include: program instructions or sets of instructions (such as program instructions 2022 or operating system 2024), which may be executed by processing subsystem 2010. For example, a ROM can store programs, utilities or processes to be executed in a non-volatile manner, and DRAM can provide volatile data storage, and may store instructions related to the operation of electronic device 2000. Note that the one or more computer programs may constitute a computer-program mechanism, a computer-readable storage medium or software. Moreover, instructions in the various modules in memory subsystem 2012 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 2010. In some embodiments, the one or more computer programs are distributed over a network-coupled computer system so that the one or more computer programs are stored and executed in a distributed manner.

In addition, memory subsystem 2012 can include mechanisms for controlling access to the memory. In some embodiments, memory subsystem 2012 includes a memory hierarchy that comprises one or more caches coupled to a memory in electronic device 2000. In some of these embodiments, one or more of the caches is located in processing subsystem 2010.

In some embodiments, memory subsystem 2012 is coupled to one or more high-capacity mass-storage devices (not shown). For example, memory subsystem 2012 can be coupled to a magnetic or optical drive, a solid-state drive, or another type of mass-storage device. In these embodiments, memory subsystem 2012 can be used by electronic device 2000 as fast-access storage for often-used data, while the mass-storage device is used to store less frequently used data.

Networking subsystem 2014 includes one or more devices configured to couple to and communicate on a wired and/or wireless network (i.e., to perform network operations), such as: control logic 2016, one or more interface circuits 2018 and a set of antennas 2020 (or antenna elements) in an adaptive array that can be selectively turned on and/or off by control logic 2016 to create a variety of optional antenna patterns or 'beam patterns.' Alternatively, instead of the set of antennas, in some embodiments electronic device 2000 includes one or more nodes 2008, e.g., a pad or a connector, which can be coupled to the set of antennas 2020. Thus, electronic device 2000 may or may not include the set of antennas 2020. For example, networking subsystem 2014 can include a Bluetooth™ networking system, a cellular networking system (e.g., a 3G/4G/5G network such as UMTS, LTE, etc.), a universal serial bus (USB) networking system, a networking system based on the standards described in IEEE 802.12 (e.g., a Wi-Fi® networking system), an Ethernet networking system, and/or another networking system.

In some embodiments, networking subsystem 2014 includes one or more radios, such as a wake-up radio that is used to receive wake-up frames and wake-up beacons, and a main radio that is used to transmit and/or receive frames or packets during a normal operation mode. The wake-up radio and the main radio may be implemented separately (such as using discrete components or separate integrated circuits) or in a common integrated circuit.

Networking subsystem 2014 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 2000 may use the mechanisms in networking subsystem 2014 for performing simple wireless communication between the electronic devices, e.g., transmitting advertising or frame frames and/or scanning for advertising frames transmitted by other electronic devices.

Within electronic device 2000, processing subsystem 2010, memory subsystem 2012 and networking subsystem 2014 are coupled together using bus 2028 that facilitates data transfer between these components. Bus 2028 may include an electrical, optical, and/or electro-optical connection that the subsystems can use to communicate commands and data among one another. Although only one bus 2028 is shown for clarity, different embodiments can include a different number or configuration of electrical, optical, and/ or electro-optical connections among the subsystems.

In some embodiments, electronic device 2000 includes a display subsystem 2026 for displaying information on a display, which may include a display driver and the display, such as a liquid-crystal display, a multi-touch touchscreen, etc. Display subsystem 2026 may be controlled by processing subsystem 2010 to display information to a user (e.g., information relating to incoming, outgoing, or an active communication session).

Electronic device 2000 can also include a user-input subsystem 2030 that allows a user of the electronic device 2000 to interact with electronic device 2000. For example, user-input subsystem 2030 can take a variety of forms, such as: a button, keypad, dial, touch screen, audio input interface, visual/image capture input interface, input in the form of sensor data, etc.

Electronic device 2000 can be (or can be included in) any electronic device with at least one network interface. For example, electronic device 2000 may include: a cellular telephone or a smartphone, a tablet computer, a laptop computer, a notebook computer, a personal or desktop computer, a netbook computer, a media player device, a wireless speaker, an IoT device, an electronic book device, a MiFi® device, a smartwatch, a wearable computing device, a portable computing device, a consumer-electronic device, a vehicle, a door, a window, a portal, an access point, a router, a switch, communication equipment, test equipment, as well as any other type of electronic computing device having wireless communication capability that can include communication via one or more wireless communication protocols.

Although specific components are used to describe electronic device 2000, in alternative embodiments, different components and/or subsystems may be present in electronic device 2000. For example, electronic device 2000 may include one or more additional processing subsystems, memory subsystems, networking subsystems, and/or display subsystems. Additionally, one or more of the subsystems may not be present in electronic device 2000. Moreover, in some embodiments, electronic device 2000 may include one or more additional subsystems that are not shown in FIG. 20. In some embodiments, electronic device may include an analysis subsystem that performs at least some of the operations in the communication techniques. Also, although separate subsystems are shown in FIG. 20, in some embodiments some or all of a given subsystem or component can be integrated into one or more of the other subsystems or component(s) in electronic device 2000. For example, in some embodiments program instructions 2022 are included in operating system 2024 and/or control logic 2016 is included in the one or more interface circuits 2018.

Moreover, the circuits and components in electronic device 2000 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 2014. This integrated circuit may include hardware and/or software mechanisms that are used for transmitting wireless signals at electronic device 2000 and receiving signals at electronic device 2000 from other electronic devices. Aside from the mechanisms herein described, radios are generally known in the art and hence are not described in detail. In general, networking subsystem 2014 and/or the integrated circuit can include any number of radios. Note that the radios in multiple-radio embodiments function in a similar way to the described single-radio embodiments.

In some embodiments, networking subsystem 2014 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 2022, operating system 2024 (such as a driver for an interface circuit in networking subsystem 2014) or in firmware in an interface circuit networking subsystem 2014. Alternatively or additionally, at least some of the operations in the communication techniques may be implemented in a physical layer, such as hardware in an interface circuit in networking subsystem 2014. In some embodiments, the communication techniques are implemented, at least in part, in a MAC layer and/or in a physical layer in an interface circuit in networking subsystem 2014.

While examples of numerical values are provided in the preceding discussion, in other embodiments different numerical values are used. Consequently, the numerical values provided are not intended to be limiting.

Moreover, while the preceding embodiments illustrated the use of wireless signals in one or more bands of frequencies, in other embodiments of the communication techniques electromagnetic signals in one or more different frequency bands are used to determine the range. For example, these signals may be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service or by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a first node configured to communicatively couple to a first antenna, and a second node configured to communicatively couple to a second antenna; and
a first radio communicatively coupled to the first node and a second radio, communicatively coupled to the second node, wherein the first radio and the second radio are configured to concurrently communicate with a recipient electronic device, and wherein the electronic device is configured to:
provide, intended for the recipient electronic device, one or more feedback criteria when selective transmission by the recipient electronic device of feedback is allowed;
transmit, from the first radio, a physical layer convergence protocol (PLCP) protocol data unit (PPDU), intended for the recipient electronic device and associated with a first link between the electronic device and the recipient electronic device, wherein the PPDU comprises a PPDU preamble and a set of media access control (MAC) protocol data units (MPDUs);
receive, at the second radio, the feedback from the recipient electronic device, the feedback associated with a second link between the electronic device and the recipient electronic device; and
perform a remedial action based at least in part on the feedback.

2. The electronic device of claim 1, wherein the remedial action comprises aborting the transmission of the PPDU.

3. The electronic device of claim 1, wherein the remedial action comprises: retransmitting, from the first radio, one or more MPDUs of the set of MPDUs intended for the recipient electronic device and associated with the first link; retransmitting, from the second radio, the one or more MPDUs of the set of MPDUs intended for the recipient electronic device and associated with the second link; or both.

4. The electronic device of claim 3, wherein the electronic device is configured to transition a transmit opportunity from the first link to the second link prior to retransmitting the one or more MPDUs of the set of MPDUs intended for the recipient electronic device using the second link.

5. The electronic device of claim 1, wherein the feedback comprises: a block acknowledgment during the transmission of the PPDU that aborts the transmission of the PPDU, or a hybrid automatic repeat request (HARD) negative acknowledgment (NACK).

6. The electronic device of claim 1, wherein the one or more feedback criteria indicate that the feedback is only allowed for a subset of access categories of PPDUs.

7. The electronic device of claim 1, wherein the electronic device is configured to transmit a modification, addressed to the recipient electronic device, when the feedback is allowed.

8. The electronic device of claim 7, wherein the modification is transmitted in one of: a beacon, a probe response, or an association response.

9. A recipient electronic device, comprising:
a first node configured to communicatively couple to a first antenna;
a second node configured to communicatively couple to a second antenna; and
a first radio communicatively coupled to the first node and a second radio communicatively coupled to the second node, wherein the first radio and the second radio are configured to concurrently communicate with an electronic device, and wherein the recipient electronic device is configured to:
receive, at the first radio, a physical layer convergence protocol (PLCP) protocol data unit (PPDU), associated with the electronic device and a first link between the electronic device and the recipient electronic device, wherein the PPDU comprises a PPDU preamble and a set of media access control (MAC) protocol data units (MPDUs);
compare estimated MPDUs in the set of MPDUs, which are based at least in part on the PPDU preamble, to the received set of MPDUs; and
provide, from the second radio, feedback intended for the electronic device, wherein the feedback is associated with a second link between the electronic device and the recipient electronic device, and the feedback is based at least in part on the comparison.

10. The recipient electronic device of claim 9, wherein the feedback is provided while the PPDU is being received.

11. The recipient electronic device of claim 9, wherein the recipient electronic device is configured to receive, associated with electronic device, one or more feedback criteria when selective transmission by the recipient electronic device of the feedback is allowed; and
wherein the feedback is selectively provided based at least in part on the one or more feedback criteria.

12. The recipient electronic device of claim 11, wherein the one or more feedback criteria indicate that the feedback is only allowed for a subset of access categories of PPDUs.

13. The recipient electronic device of claim 11, wherein the one or more feedback criteria comprises one or more of: a predefined elapsed time since a start of receiving the PPDU, or a predefined time duration before an end of receiving the PPDU.

14. The recipient electronic device of claim 9, wherein the feedback comprises at least one of a block acknowledgment, or a hybrid automatic repeat request (HARD) negative acknowledgment (NACK).

15. The recipient electronic device of claim 9, wherein the recipient electronic device is configured to receive a modification associated with the electronic device when the feedback is allowed.

16. The recipient electronic device of claim 15, wherein the modification is received in: a beacon, a probe response, or an association response.

17. The recipient electronic device of claim 9, wherein the recipient electronic device is configured to request a transmit opportunity on the second link to provide the feedback.

18. The recipient electronic device of claim 9, wherein the feedback is included in a control field of a MAC header in a block acknowledgment.

19. A method for providing feedback, comprising:
by a recipient electronic device:
   receiving, at a first radio in the recipient electronic device, a physical layer convergence protocol (PLCP) protocol data unit (PPDU), associated with an electronic device and a first link between the electronic device and the recipient electronic device, wherein the PPDU comprises a PPDU preamble and a set of media access control (MAC) protocol data units (MPDUs);
   comparing estimated MPDUs in the set of MPDUs, which are based at least in part on the PPDU preamble, to the received set of MPDUs; and
   providing, from a second radio in the recipient electronic device, the feedback intended for the electronic device, wherein the feedback is associated with a second link between the electronic device and the recipient electronic device, and the feedback is based at least in part on the comparison.

20. The method of claim 19, wherein the method comprises receiving, associated with electronic device, one or more feedback criteria when selective transmission by the recipient electronic device of the feedback is allowed; and
   wherein the feedback is selectively provided based at least in part on the one or more feedback criteria.

21. The method of claim 20, wherein the one or more feedback criteria indicate that the feedback is only allowed for a subset of access categories of PPDUs.

* * * * *

UNITED STATES PATENT AND TRADEMARK OFFICE
CERTIFICATE OF CORRECTION

| | | |
|---|---|---|
| PATENT NO. | : 11,677,507 B2 | Page 1 of 1 |
| APPLICATION NO. | : 17/183170 | |
| DATED | : June 13, 2023 | |
| INVENTOR(S) | : Jarkko L. Kneckt et al. | |

It is certified that error appears in the above-identified patent and that said Letters Patent is hereby corrected as shown below:

In the Claims

Column 24, Line 11, Claim 5 delete "(HARD)" and insert --(HARQ)--.

Column 25, Line 3, Claim 14 delete "(HARD)" and insert --(HARQ)--.

Signed and Sealed this
Thirty-first Day of October, 2023

Katherine Kelly Vidal
*Director of the United States Patent and Trademark Office*